US009009820B1

(12) United States Patent
McDougal et al.

(10) Patent No.: US 9,009,820 B1
(45) Date of Patent: Apr. 14, 2015

(54) SYSTEM AND METHOD FOR MALWARE DETECTION USING MULTIPLE TECHNIQUES

(75) Inventors: Monty D. McDougal, St. Paul, TX (US); William E. Sterns, Wylie, TX (US); Randy S. Jennings, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/027,046

(22) Filed: Feb. 14, 2011

Related U.S. Application Data

(63) Continuation-in-part of application No. 12/719,535, filed on Mar. 8, 2010.

(51) Int. Cl.
*G06F 11/00* (2006.01)
*G06F 21/56* (2013.01)

(52) U.S. Cl.
CPC ..................................... *G06F 21/566* (2013.01)

(58) Field of Classification Search
CPC ........................... G06F 21/562; H04L 63/145
USPC .......................................................... 726/22
See application file for complete search history.

(56) References Cited

U.S. PATENT DOCUMENTS

| 5,283,887 | A | * | 2/1994 | Zachery | .......................... | 715/210 |
| 5,832,208 | A | | 11/1998 | Chen et al. | | |
| 5,907,834 | A | | 5/1999 | Kephart et al. | | |
| 6,092,194 | A | | 7/2000 | Touboul | | |
| 7,103,633 | B1 | * | 9/2006 | Malik | .......................... | 709/206 |
| 7,188,367 | B1 | | 3/2007 | Edwards et al. | | |
| 7,243,373 | B2 | * | 7/2007 | Muttik et al. | .................... | 726/24 |
| 7,269,851 | B2 | | 9/2007 | Ackroyd | | |
| 7,373,659 | B1 | | 5/2008 | Vignoles et al. | | |

(Continued)

FOREIGN PATENT DOCUMENTS

| EP | 1 657 662 A2 | 10/2005 |
| WO | WO 2005/114414 A1 | 12/2005 |

(Continued)

OTHER PUBLICATIONS

"How to Change Default Programs in Windows 7" (Strider, TechTalkz.com, Jan. 28, 2009).*

(Continued)

*Primary Examiner* — Vivek Srivastava
*Assistant Examiner* — Nicholas Celani
(74) *Attorney, Agent, or Firm* — Schwegman Lundberg & Woessner, P.A.

(57) ABSTRACT

In certain embodiments, a method includes receiving, at a first malware detection node, from a malware detection system a request to apply a first malware detection technique to a file. The malware detection system is configured to determine whether the file is suspected malware by analyzing a plurality of predefined result states received in response to the first malware detection node applying the first malware detection technique to the file and a second malware detection node applying a second malware detection technique to the file. The method includes receiving at least one result from a malware detection engine of applying the first malware detection technique to the file and determining at least one predefined result state based on the received at least one result. The method includes reporting, by the first malware detection node, the at least one predefined result state to the malware detection system.

14 Claims, 9 Drawing Sheets

(56) References Cited

U.S. PATENT DOCUMENTS

| | | | |
|---|---|---|---|
| 7,392,544 B1* | 6/2008 | Pavlyushchik | 726/24 |
| 7,607,171 B1 | 10/2009 | Marsden et al. | |
| 7,630,379 B2 | 12/2009 | Morishita et al. | |
| 7,640,589 B1 | 12/2009 | Mashevsky et al. | |
| 7,788,723 B2 | 8/2010 | Huddleston | |
| 8,863,279 B2 | 10/2014 | McDougal et al. | |
| 2002/0194487 A1 | 12/2002 | Grupe | |
| 2003/0023864 A1 | 1/2003 | Muttik et al. | |
| 2003/0120947 A1 | 6/2003 | Moore et al. | |
| 2005/0021994 A1 | 1/2005 | Barton et al. | |
| 2006/0015630 A1 | 1/2006 | Stolfo et al. | |
| 2006/0015940 A1 | 1/2006 | Zamir et al. | |
| 2006/0294588 A1* | 12/2006 | Lahann et al. | 726/23 |
| 2007/0121822 A1* | 5/2007 | Carnale et al. | 379/88.14 |
| 2007/0150948 A1 | 6/2007 | De Spiegeleer | |
| 2007/0220607 A1 | 9/2007 | Sprosts et al. | |
| 2008/0010683 A1 | 1/2008 | Baddour et al. | |
| 2008/0052729 A1* | 2/2008 | Paul et al. | 719/328 |
| 2008/0066150 A1 | 3/2008 | Lim | |
| 2008/0282153 A1* | 11/2008 | Kindeberg et al. | 715/256 |
| 2008/0313733 A1 | 12/2008 | Kramer et al. | |
| 2008/0320594 A1 | 12/2008 | Jiang et al. | |
| 2009/0013405 A1* | 1/2009 | Schipka | 726/22 |
| 2009/0125902 A1 | 5/2009 | Ghosh et al. | |
| 2009/0183175 A1* | 7/2009 | Walker et al. | 719/313 |
| 2009/0187992 A1 | 7/2009 | Poston | |
| 2009/0222922 A1 | 9/2009 | Sidiroglou | |
| 2011/0072514 A1 | 3/2011 | Gilder et al. | |
| 2011/0119730 A1 | 5/2011 | Eldar et al. | |
| 2011/0167494 A1 | 7/2011 | Bowen et al. | |
| 2011/0219450 A1 | 9/2011 | Mcdougal et al. | |
| 2011/0219451 A1 | 9/2011 | McDougal et al. | |

FOREIGN PATENT DOCUMENTS

| | | |
|---|---|---|
| WO | WO 2008/091785 A2 | 7/2008 |
| WO | WO-2011112347 A3 | 9/2011 |

OTHER PUBLICATIONS

"Internet Content Adaptation Protocol (ICAP)", Network Appliance, Version 1.01, 13 pages, Jul. 30, 2001.
J. Elson, et al., "Internet Content Adaptation Protocol (ICAP)", Network Working Group, Request for Comments: 3507, Category: Informational, 44 pages, Apr. 2003.
Feinstein, B., "Snort Plug-in Development: Teaching an Old Pig New Tricks", DEFCON 16, SecureWorks, Inc., 49 pages, Aug. 8, 2008.
SNORT® Users Manual 2.9.0, The Snort Project, 198 pages, Dec. 2, 2010.
"Welcome to the new Milter.org", www.milter.org, Copyright © 2011 Sendmail, Inc., 2 pages, Printed Jan. 14, 2011.
"API Documentation", www.milter.org, Copyright © 2011 Sendmail, Inc., 4 pages, Printed Jan. 14, 2011.
"Architecture", www.milter.org, Copyright © 2011 Sendmail, Inc., 3 pages, Printed Jan. 14, 2011.
"Technical Overview", www.milter.org, Copyright © 2011 Sendmail, Inc., 3 pages, Printed Jan. 14, 2011.
PCT, Invitation to Pay Additional Fees and, Where Applicable, Protest Fee, International Application No. PCT/US2011/025679, 6 pages, Apr. 29, 2011.
PCT, Notification of Transmittal of the International Search Report and the Written Opinion of the International Searching Authority, or the Declaration, International Application No. PCT/US2011/025683, 10 pages, Apr. 8, 2011.
McLeod, John, "Windows NT/2000 Incident Response Tools", web.archive.org/web/.../IRCR.htm, 2 pages, 2000.
Kornblum, Jesse, "Preservation of Fragile Digital Evidence by First Responders", Air Force Office of Special Investigations, Computer Investigations and Operations, Digital Forensics Research Workshop, 11 pages, Aug. 8, 2002.
McDougal, Monty, "Live Forensics on a Windows System: Using Windows Forensic Toolchest (WFT)", Foolmoon Software & Security, http://www.foolmoon.net/security/monty@foolmoon.net, 23 pages, 2003.
Oberheide, Jon, et al., "Rethinking Antivirus: Executable Analysis in the Network Cloud", jon.oberheide.org/files/hotsec07-cloud.pdf, 5 pages, 2007.
Garretson, Cara, "Avinti upgrade targets blended threats", "Observation engine now searches e-mail body for links to malware", networkworld.com/.../050907-avinti.html, 3 pages, May 9, 2007.
Oberheide, Jon, et al., "Virtualized In-Cloud Security Services for Mobile Devices", jon.oberheide.org/files/mobivirt08-mobilecloud.pdf, 5 pages, 2008.
Oberheide, Jon, et al., "CloudAV: N-Version Antivirus in the Network Cloud", www.eecs.umich.edu/fjgroup/pubs/usenix08-cloudav, 16 pages, 2008.
Press Releases, The Newsroom, "SonicWALL Expands Deep Packet Protection with SSL Inspection for Midsized and Large Businesses", "Comprehensive SSL inspection technology grants network administrators control over SSL encrypted applications and HTTPS web browsing", SonicWALL, Inc., http://news.sonicwall.com/index.php?s. . . , 2 pages, Feb. 11, 2008.
Press Releases, The Newsroom, "SonicWALL Advances Industry-Leading Enterprise-Class Email Security Solutions", "Upgrade significantly enhances e-mail protection performance, offering the industry highly effective protection against spam and malware", SonicWALL, Inc., http://news.sonicwall.com/index.php?s . . . , 3 pages, Nov. 3, 2008.
"F-Secure Exploit Shield protects against 'zero-day' vulnerability exploits", f-secure.com/.../fs_news_20081217_01 . . . , 4 pages, Dec. 17, 2008.
"Analyse your Malware on Windows simply and quickly", Joebox, http://www.joebox.org/concept.php, 5 pages, 2009.
"Analyse your Malware on Windows simply and quickly", Joebox, http://www.joebox.org/vision.php, 3 pages, 2009.
Press Releases, "Mandiant Launches Mandiant Intelligent Response V1.3", "MIR 1.3 features advanced memory forensics, Indicator of Compromise Editor and increased scalability, helping responders find evil faster", Mandiant, mandiant.com/.../mandiant_launches_. . . , 2 pages, Apr. 20, 2009.
Press Release, "IBM Introduces Products and Services to Combat New Security Threats", IBM, www-03.ibm.com/press/us/.../27269.wss, 4 pages, Apr. 21, 2009.
Press Release, "Mirapoint Messaging Products Solve All Aspects of Business Email Security and Archiving", "Ensure Spam-Free Archives and Virus-Free Networks—Lower Corporate Storage Costs, E-Discovery Fees, TCO", http://www.mirapoint.com/index.php?i . . . , 1 page, Apr. 21, 2009.
Press Release, "Norman launches SandBox SDK", Norman ASA, norman.com/about_norman/.../en, 1 page, Apr. 21, 2009.
Press Release, "Barracuda Networks Launches New Enterprise—Class Barracuda Web Filter", "Barracuda Web Filter 1010 Handles up to 12,000 Concurrent Users in a Single Appliance", Barracuda Networks, Inc., barracudanetworks.com/ns/.../index.ph . . . , 1 page, May 19, 2009.
Press Release,: "Check Point Introduces New Line of Security Management Appliances Based on the Software Blade Architecture", "Smart-1 appliances are first to unify network, IPS and endpoint security policy management and provide up to 12 TB of integrated storage", Check Point® Software Technologies, Ltd., checkpoint.com/.../smart-1052609.html, 3 pages, May 26, 2009.
Press Release, "Check Point Announces Immediate Availability of IP Appliances Integrated With Security Software Blades", "New IP appliance line includes Check Point's revolutionary intrusion prevention software blade and delivers highest performance with lower cost of ownership", Check Point® Software Technologies, Ltd., checkpoint.com/.../ip-appliance-softwar . . . , 3 pages, Jun. 1, 2009.
Press Release, "New IBM Security Software Delivers 'Holistic' Approach to Identity and Access Management", IBM, www-03.ibm.com/press/us/.../27802.wss, 3 pages, Jun. 23, 2009.
Press Release, "Cisco Protects Network Traffic with Gateway Security Products and Services; E-mail Security Solutions Embed RSA Data Loss Prevention Technology"; "New E-mail, Web and Security Service Offerings Designed to Prevent Loss of Data in Motion", cisco.com/dlls/2009/prod_062409.html, 3 pages, Jun. 24, 2009.

(56) References Cited

OTHER PUBLICATIONS

Mills, Elinor, "*Postini: Google's take on e-mail security*", CNET News, Security, cnet.com/8301-1009_3-10276548-83, 7 pages, Jul. 1, 2009.
Press Releases, "*ManTech International Establishes ManTech Cyber Solutions, International, Inc.*", "*A Wholly-Owned Subsidiary Formed to Develop and Market Cyber Products & Solutions*", ManTech International Corporation, investor.mantech.com/phoenix.zhtml?c . . . , 2 pages, Jul. 8, 2009.
Press Release, "*Check Point Establishes a New Standard in Endpoint Security*", "*Endpoint Security R72 delivers breakthrough end-user simplicity and Web threat protection*", Check Point® Software Technologies Ltd., checkpoint.com/.../endpoint-r72-07130 . . . , 3 pages, Jul. 13, 2009.
Press Release, "*Check Point Extends Its Leadership in Security Management With a New Change Management Software Blade*", "*SmartWorkflow enables security policy change management helping customers reduce errors and enhance compliance*", Check Point® Software Technologies Ltd., checkpoint.com/.../smartworkflow-0713 . . . , 3 pages, Jul. 13, 2009.
Press Release, "*Upcoming CWSandbox enhancements allow security providers to automate bulk malware analysis; Exploit Feed adds to Threat Track portfolio*", Sunbelt Software, sunbeltsoftware.com/Press/releases/?i . . . , 2 pages, Jul. 29, 2009.
Press Release, "*IBM Acts to Protect Enterprises Against Web Application Attacks*", IBM, www-03.ibm.com/press/us/...28162.wss, 3 pages, Aug. 10, 2009.
Press Release, "*QinetiQ North America offers cyber security jumpstart*", QinetiQ North America, qinetiq-na.com/.../news-and-eventslat . . . , 2 pages, Sep. 8, 2009.
Press Release, "*New Version for Microsoft Exchange Environments Integrates Sunbelt VIPRE Antivirus Engine*", Sunbelt Software, sunbeltsoftware.com/Press/Releases/?i . . . , 2 pages, Sep. 8, 2009.
Press Release, "*McAfee, Inc. Expands Next-Generation Web Security for HP BladeSystem Architecture*", "*Now Offers Enhanced Web Security and Infrastructure Support for HP BladeSystem*", McAfee, Inc., ...mcafee.com/article_display.cfm?articl . . . , 3 pages, Sep. 15, 2009.
Press Release, "*Proofpoint Introduces its Next-Generation Email Security and Privacy Platform with Enhanced Email Encryption, Available for SaaS and Appliance Deployment*", "*Proofpoint 6 Offers Easy-to-Use, 'Defense in Depth' Data Loss Prevention with Integrated Email Encryption Capabilities, DKIM Email Authentication and Administrative Enhancements*", Proofpoint, Inc., proofpoint.com/.../pressdetail.php?Pres . . . , 3 pages, Oct. 5, 2009.
Press Releases, "*CA Announces New Product Releases to Help Strengthen IT Security and Reduce Costs of Managing Compliance for Physical and Virtual Environments*", "*CA Security and Governance Products Proactively Streamline Compliance Processes, Help Secure Privileged User Access, and Advance Identity Lifecycle Management*", CA, Inc., ca.com/.../CA-Announces-New-Product- . . . , 3 pages, Oct. 20, 2009.
EMC Press Release, "*RSA Announces Services and Solutions for Implementing World-Class Security Operations*", "*EMC's Security Division Delivers Consulting Services and Technology Capabilities Designed to Help Enterprises More Effectively Manage Information Risk and Compliance*", RSA, emc.com/about/.../20091021-02.htm, 2 pages, Oct. 21, 2009.
Press Release, "*Websense Extends Advanced Security Protection of ThreatSeeker Network to Third-Party Solution Providers Through Cloud-Based Infrastructure*", "*Web-Based API Enables Delivery of Industry's Leading Security Intelligence to New Markets and End Users*", Websense, Inc., investor.websense.com/releasedetail.cf . . . , 2 pages, Oct. 28, 2009.
Press Release, "*Juniper Networks Delivers Security At Massive Scale for Cloud Services, Mega Data Centers*", "*Cloud-Ready Data Center Initiative Offers Pragmatic Solutions to Simplify, Share and Secure Infrastructure*", Juniper Networks, juniper.net/.../pr_2009_10_29-12_01.h . . . , 3 pages, Oct. 29, 2009.
Press Release, "*Barracuda Spam & Virus Firewall Introduces New Features Targeted at Service Providers and Enterprises*", "*New Firmware Release 4.0 Enhances Administration of Multitenant Services and Site-to-Site Email Encryption*", Barracuda Networks Inc., barracudanetworks.com/ns/.../index.ph . . . , 1 page, Nov. 4, 2009.
Press Release, "*Kaspersky Lab Announces Compatibility with Windows Server 2008 R2 and Windows 7 for SMB and Enterprise Customers*", "*Kaspersky Open Space Security R2 Brings State-of-the-Art Anti-Malware Protection to Windows Workstations and File Server Endpoints, with Superior Speed and Intuitive Management Console*", Kaspersky Lab, ...kaspersky.com/.../news-press-release . . . , 2 pages, Nov. 9, 2009.
Press Release, "*M86 Security Releases MailMarshal with Most Advanced Protection for Blended Threats and Spam*", "*MailMarshal SMTP 6.7 Leverages First Behavior-Based Malware Detection Service to Identify and Combat New Blended Threats*", M86 Security, m86security.com/.../M86-Security-Rele . . . , 2 pages, Nov. 10, 2009.
Press Release, "*Clearswift creates a Cloud Machine*", Clearswift, Unifying Information Security, Clearswift, clearswift.com/.../clearswift-creates-a-c . . . , 1 page, Nov. 11, 2009.
Press Release, "*Blue Coat Advances Hybrid Secure Web Gateway to Provide Enterprises with Continuous Threat Protection at Lower TCO*", "*Unites New High-Performance ProxySG and ProxyAV Appliances with Scalable, Cloud-based Defenses and Extended Protection for Remote Users*", Blue Coat Systems, Inc., http://www.bluecoat.com/news/pr3575, 3 pages, Nov. 16, 2009.
Press Release, "*Sophos launches next generation of hardware security modules*", "*High-end model SafeGuard CryptoServer Se1000 marks new top line for cryptographic performance*", Sophos, sophos.com/.../sophos-hsm.html, 1 page, Nov. 16, 2009.
Press Release, "*WatchGuard Expands Into Messaging and Content Security Markets*", "*WatchGuard, Leader of Multifunction Firewall Appliances, Unveils Extensible Content Security (XCS) Platform to Provide Business E-mail, Web Content, Data Loss Prevention and Cloud-based Protection*", WatchGuard® Technologies, watchguard.com/news/.../wg443.asp, 2 pages, Nov. 17, 2009.
Press Release, "*Sophos and Juniper Networks deliver integrated anti-spam solution for branch office applications*", "*Real-time anti-spam intelligence from SophosLabs protects Juniper Networks branch services gateways and routers*", Sophos and Juniper Networks, sophos.com/.../juniper-networks-oem.h . . . , 2 pages, Nov. 23, 2009.
Press Release, "*New F-Secure Solution Offers Faster, Lighter and Safer IT Security for Businesses*", "*Faster and safer protection with less resource use—F-Secure Client Security 9 offers centrally managed security that makes sense for business*", F-Secure , f-secure.com/.../fs_news_20091130_01 . . . , 4 pages, Nov. 30, 2009.
Press Release, "*Cisco Completes Acquisition of ScanSafe, Leading SaaS Web Security Provider*", Cisco, ...cisco.com/dlls/.../corp_120709b.html, 2 pages, Dec. 7, 2009.
Press Release, "*NetFlow-based StealthWatch by Lancope Rapidly Detects Malware and Responds to Escalating Worm Attacks*", Lancope®, Inc., ...lancope.com/.../NetFlow-based-Stealt, 3 pages, Dec. 7, 2009.
Press Release, "*M86 Security Announces Rebranded and Enhanced Secure Web Gateway Appliances from Finjan Acquisition*", "*M86 Bolsters Protection Against Web-based Threats with Real-time Code Analysis and Becomes World's Largest Secure Web Appliance Vendor*", M86 Security, m86security.com/.../M-86-Security-Anno . . . , 2 pages, Dec. 10, 2009.
Press Release, "*Symantec and Message Systems Join Forces to Develop Next Generation Security and Messaging Solutions*", "*Industry leaders release first joint solution for communication service providers*", Symantec Corp., symantec.com/about/news/.../article.js . . . , 3 pages, Dec. 17, 2009.
Press Release, "*Blue Coat Expands K9 Web Protection to Windows 7 to Protect Families from Objectionable Web Content and Threats*", Blue Coat Systems, Inc., http://www.bluecoat.com/news/pr3670, 2 pages, Jan. 4, 2010.
Press Release, "*FireEye Provides Pre-Emptive Protection to Customers Against Current Internet Explorer Vulnerability Using Generalized Malware Analysis Platform*", "*Company Confirms Detection of*

(56) References Cited

OTHER PUBLICATIONS

'Operation Aurora' Attacks at Customer Sites in 2009", FireEye, Inc., fireeye.com/.../press-releases,php?id=13, 2 pages, Jan. 18, 2010.
Press Release, "Clearswift to Showcase Unified Content Security for Web and Email at Legal Tech 2010", Clearswift, clearswift.com/.../clearswift-to-showcas . . . , 2 pages, Jan. 20, 2010.
News Release, "HP Strengthens Security Capabilities to Help Customers Protect Data and Combat Business Threats", "New services, solutions address security from the printer to the cloud", HP, hp.com/hpinfo/.../100125a.html, 3 pages, Jan. 25, 2010.
Press Release, "WatchGuard Enhances Security Software", "Fireware XTM OS Update Provides Enhanced Security Capabilities and Improved Management Functions—Ideal for MSSPs and Enterprise Organizations", WatchGuard® Technologies, Inc., watchguard.com/news/.../wg448.asp, 2 pages, Jan. 29, 2010.
Press Release, "Barracuda Networks Introduces the Barracuda NG Firewall", "Enterprise Firewall Platform Integrates Next Generation Firewall Protection, Industry-leading Centralized Management Capabilities and Optimization of Network Traffic Across WAN Link", Barracuda Networks Inc., barracudanetworks.com/ns/.../index.ph . . . , 1 page, Feb. 2, 2010.
Press Release, "Kaspersky Lab improves system for processing new malicious programs", Kaspersky Lab, http://www.kaspersky.com/news?id=2 . . . , 2 pages, Feb. 11, 2010.
Press Release, "Juniper and Nokia Siemens Networks Introduce New Security Solutions for Fixed and Mobile Networks", "Certified Security Solutions Protect Network Infrastructures and Subscriber Data from Unauthorized Access and Network Attacks",. Juniper Networks, Inc., juniper.net/.../pr_2010_02_14-04_00.h . . . , 2 pages, Feb. 14, 2010.
Press Release, "Juniper Confronts Mobile Security Challenge; First to Protect Pathways From Smartphones to Applications and Corporate Networks", "Junos® Pulse and Mobile Secure Deliver Pervasive Mobile Security, Enabling Secure User Experiences and New Service Models for Operators"; Juniper Networks, Inc., juniper.net/.../pr_2010_02_14-04_06.h . . . , 3 pages, Feb. 14, 2010.
Press Release, "Blue Coat and IBM Expand Relationship to Deliver Front Line of Defense against Web-based Threats", "New Agreement Provides Enterprise Clients with Security, Control and Ease of Management" Blue Coat Systems, Inc., http://www.bluecoat.com/news/pr/4215, 2 pages, Feb. 23, 2010.
U.S. Appl. No. 12/719,535 entitled "System and Method for Malware Detection", inventor Monty D. McDougal, et al., 65 pages including specification, claims, abstract, and drawings, Mar. 8, 2010.
U.S. Appl. No. 12/719,614 entitled "System and Method for Host-Level Malware Detection", inventor Monty D. McDougal, et al., 94 pages including specification, claims, abstract, and drawings, Mar. 8, 2010.
Press Release, "Axway Certified by the U.S. Government for Data Security", "FIPS Certification Further Strengthens B2B Data Security for Synchrony™ Framework Customers", axway.com/.../axway-certified-us-gover . . . , 2 pages, Printed Aug. 30, 2010.
Press Release, "Axway Integrates SecureTransport™ with Synchrony™ Sentinel to Offer Robust Visibility and Management for Managed File Transfer", "Newest SecureTransport Enables Flexible, Managed File Transfer with Complete Visibility and Interfaces with Connect:Direct", Axway, axway.com/.../axway-integrates-secure . . . , 2 pages, Printed Aug. 30, 2010.
Press Release, "Axway MailGate Enhances Email Data Leak Prevention with Digital Rights Management for Attachments", "MailGate Policy Engine Incorporates Digital Rights Management to Extend Email Data Protection Beyond Company Walls", Axway, axway.com/.../axway-mailgate-enhanc . . . , 3 pages, Printed Aug. 30, 2010.
Cyber Solutions, "Integrated solutions for the continuum of cyber operations", The Boeing Company, http://www.boeing.com/defense-space, 2 pages, Printed Aug. 30, 2010.
Press Release, "ScanSafe Named Worldwide Leader of SaaS Security Market by Leading Analyst Firm", ScanSafe, scansafe.com/.../scansafe-named-worl . . . , 2 pages, Printed Aug. 30, 2010.
"API Logger Overview", http://labs.idefense.com/files/labs/rele . . . , 1 page, Printed Sep. 1, 2010.
"Process Analyzer Overview", http://labs.idefense.com/files/Iabs/rele . . . , 1 page, Printed Sep. 1, 2010.
"Sniff Hit Overview", http://labs.idefense.com/files/labs/rele . . . , 1 page, Printed Sep. 1, 2010.
"SysAnalyzer Overview", http://labs.idefense.com/files/labs/rele . . . , 1 page, Printed Sep. 1, 2010.
"WOMBAT Project Description", Worldwide Observatory of Malicious Behaviors and Attack Threats, wombat-project.eu/wombat-project-de . . . , 2 pages, Printed Sep. 1, 2010.
"ThreatExpert: Introduction", ThreatExpert, www.threatexpert.com/introduction.aspx, 2 pages, Printed Sep. 1, 2010.
Virus Total, "About Virus Total", http://www.virustotal.com/about.html, 4 pages, Printed Sep. 1, 2010.
Wepawet (alpha), http://wepawet.iseclab.org/support.php, 3 pages, Printed Sep. 1, 2010.
PCT, Notification of Transmittal of the Intl. Search Report and the Written Opinion of the Intl. Searching Authority, or the Declaration, mailed on Sep. 12, 2011, regarding International Application No. PCT/US2011/025679 filed Feb. 22, 2011.
"U.S. Appl. No. 12/719,535, Non Final Office Action mailed May 9, 2012", 31 pgs.
"U.S. Appl. No. 12/719,535, Non Final Office Action mailed Nov. 9, 2012", 33 pgs.
"U.S. Appl. No. 12/719,535, Response filed Sep. 10, 2012 to Non Final Office Action mailed May 9, 2012", 18 pgs.
"International Application Serial No. PCT/US2011/025679, International Preliminary Report on Patentability mailed Sep. 20, 2012", 9 pgs.
"U.S. Appl. No. 12/719,535, Examiner Interview Summary mailed Feb. 19, 2013", 3 pgs.
"U.S. Appl. No. 12/719,535, Final Office Action mailed May 8, 2013", 38 pgs.
"U.S. Appl. No. 12/719,535, Response filed Feb. 11, 2013 to Non Final Office Action mailed Nov. 9, 2012", 19 pgs.
"Upcoming CWSandbox enhancements allow security providers to automate bulk malware analysis; Exploit Feed adds to Threat Track portfolio", [online]. [retrieved on Sep. 1, 2010]. Retrieved from the Internet: <URL: http://sunbeltsoftware.com/Press/releases/?i...>, (Jul. 29, 2009), 2 pgs.
"U.S. Appl. No. 12/719,535, Advisory Action mailed Jul. 22, 2013", 4 pgs.
"U.S. Appl. No. 12/719,535, Response filed Jul. 8, 2013 to Final Office Action mailed May 8, 2013", 19 pgs.
"U.S. Appl. No. 12/719,535, Response filed Oct. 8, 2013 to Final Office Action mailed May 8, 2013", 20 pgs.
"U.S. Appl. No. 12/719,535, Non Final Office Action mailed Mar. 12, 2014", 44 pgs.
"U.S. Appl. No. 12/719,535, Response filed Jun. 4, 2014 to Non Final Office Action mailed Mar. 12, 2014", 22 pgs.
"International Application Serial No. PCT/US2011/025679, International Search Report mailed Sep. 12, 2011", 4 pgs.
"International Application Serial No. PCT/US2011/025679, Written Opinion mailed Sep. 12, 2011", 7 pgs.
"U.S. Appl. No. 12/719,535, Notice of Allowance mailed Jun. 13, 2014", 28 pgs.

* cited by examiner

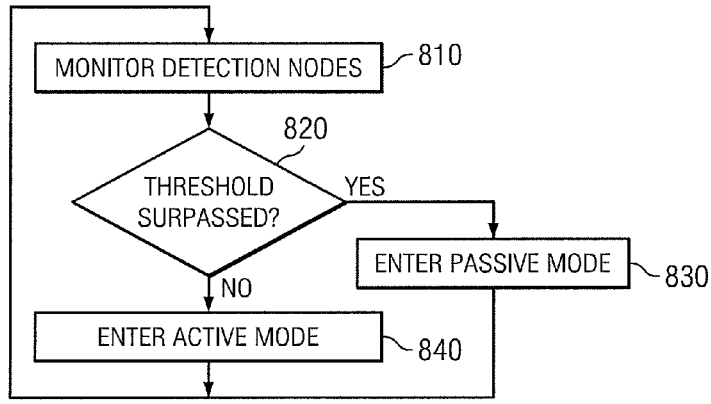
FIG. 8
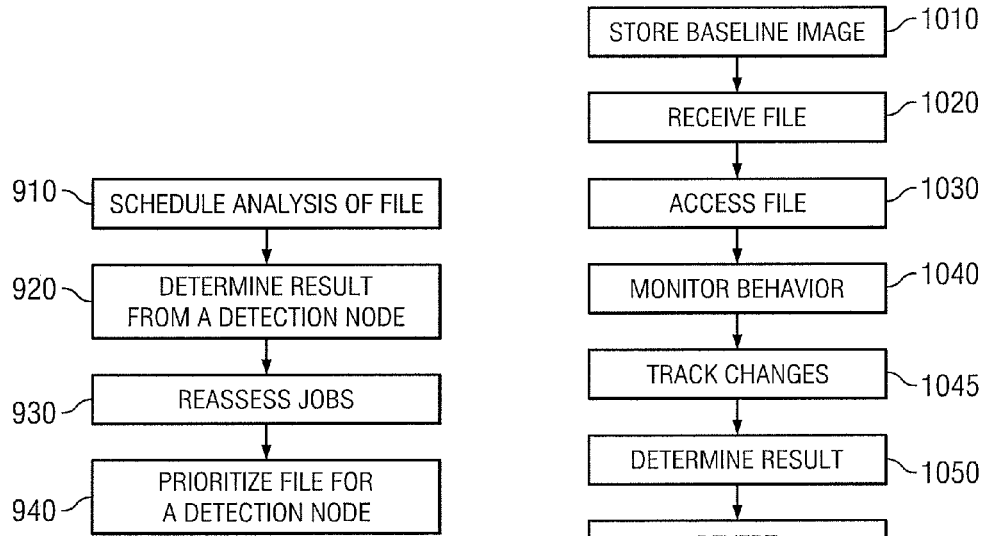
FIG. 9
FIG. 10

SYSTEM AND METHOD FOR MALWARE DETECTION USING MULTIPLE TECHNIQUES

RELATED APPLICATION

This application is a continuation-in-part of pending U.S. application Ser. No. 12/719,535 filed Mar. 8, 2010, the entire contents of which is hereby incorporated by reference.

TECHNICAL FIELD

This disclosure relates generally to computer security and more particularly to a system and method for malware detection using multiple techniques.

BACKGROUND

Malware (such as viruses, trojans, and other malicious software) has become increasingly more difficult to protect against. Various methods have been used to combat malware but more sophisticated malware continues to abound. Methods of detection have grown more complex, but have also taken longer to execute as a result of this complexity. Certain systems, such as messaging systems, require malware detection to proceed at a pace that, at times, can render the usage of sophisticated malware detection schemes unavailable. This leaves such systems vulnerable. Further, securing systems or networks using different malware detection technologies can be cumbersome due to incompatibilities between the different malware detection technologies.

SUMMARY

According to certain embodiments of the present disclosure, disadvantages and problems associated with previous techniques for malware detection may be reduced or eliminated.

In certain embodiments, a method includes receiving, at a first malware detection node, from a malware detection system a request to apply a first malware detection technique to a file. The malware detection system is configured to determine whether the file is suspected malware by analyzing a plurality of predefined result states received in response to the first malware detection node applying the first malware detection technique to the file and a second malware detection node applying a second malware detection technique to the file. The method includes receiving, at the first malware detection node, at least one result from a malware detection engine of applying the first malware detection technique to the file. Further, the method includes determining, at the first malware detection node, at least one predefined result state of the plurality of predefined result states based on the received at least one result. The method also includes reporting, by the first malware detection node, the at least one predefined result state to the malware detection system.

In certain embodiments, the request may be in a first format that the malware detection system is configured to use when communicating with the first malware detection node and the second malware detection node. The method may include receiving, at the first malware detection node, the file from the malware detection system in a communication in the first format. The method may also include providing, by the first malware detection node, the file to the malware detection engine in a second format different than the first format. The malware detection engine may be configured to process files received in the second format but not files received in the first format. In addition, the method may include receiving, at the first malware detection node, the at least one result in the second format from the malware detection engine.

In certain embodiments, the file may be a first file. The method may further include providing, by the first malware detection node, a second file to the malware detection system. The second file may be generated by the malware detection engine while applying the first malware detection technique to the first file.

In certain embodiments, an apparatus includes at least one processor and at least one computer-readable medium comprising instructions that, when executed by the at least one processor, are operable to send to a first malware detection node a first request to apply a first malware detection technique to a file. The instructions are also operable to send to a second malware detection node a second request to apply a second malware detection technique to the file. Further, the instructions are operable to receive a first predefined result state from the first malware detection node in response to a first malware detection engine providing a first result of applying the first malware detection technique to the file. The apparatus is configured to analyze the first predefined result state. In addition, the instructions are operable to receive a second predefined result state from the second malware detection node in response to a second malware detection engine providing a second result of applying the second malware detection technique to the file. The apparatus is configured to analyze the second predefined result state. The instructions are also operable to analyze the first and second predefined result states. In addition, the instructions are operable to determine whether the file is malware in response to analyzing the first and second predefined result states.

Certain embodiments of the present disclosure may provide one or more technical advantages. In certain embodiments, new malware detection techniques may be implemented in a system that uses a plurality of malware detection techniques efficiently. A malware detection engine implementing the new malware detection technique may be added to a system that applies multiple malware detection techniques without having to modify the malware detection engine.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which:

FIG. 8 is a flowchart illustrating one embodiment of a malware detection system dynamically changing between an active and passive mode;

FIG. 9 is a flowchart illustrating one embodiment of dynamic scheduling in a malware detection system;

FIG. 10 is a flowchart illustrating one embodiment of applying a behavior-based malware detection scheme to a file;

DESCRIPTION OF EXAMPLE EMBODIMENTS

Figure 1:
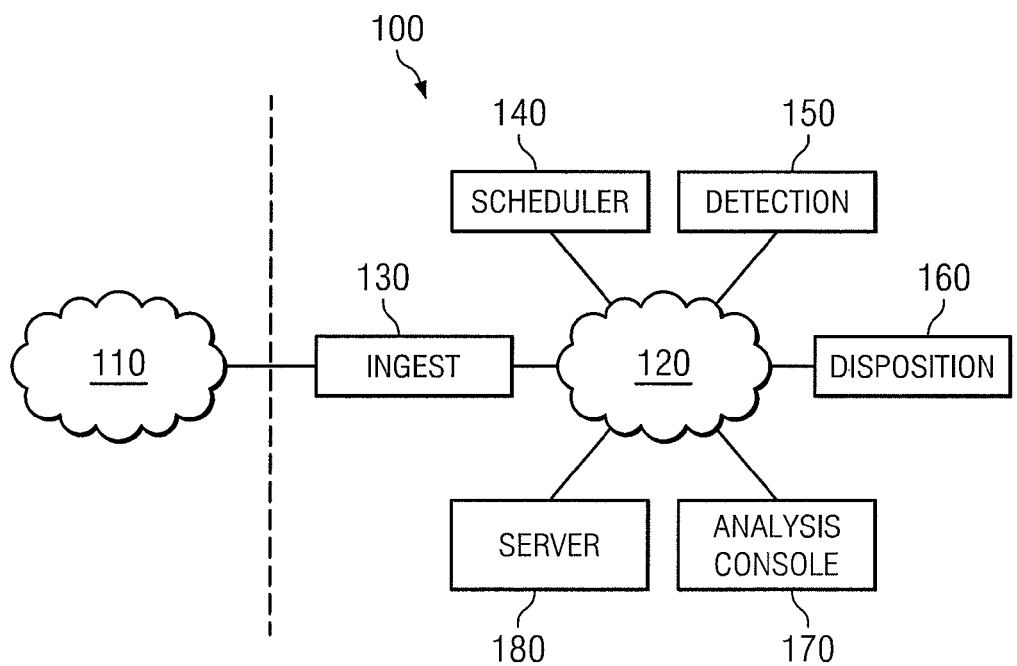
FIG. 1 is a block diagram illustrating one embodiment of a system that is operable to detect malware.

FIG. 1 is a block diagram illustrating one embodiment of system 100 that is operable to detect malware. The block diagram includes external network 110 and internal network 120. Internal network 120 couples ingest block 130, scheduler block 140, detection block 150, disposition block 160, analysis console 170 and server 180. By being coupled to internal network 120, blocks 130-180 may communicate with each other. In various embodiments, communication between blocks 130-180 utilizing internal network 120 may be indirect. For example, one or more of blocks 130-180 may be in a demilitarized zone (DMZ) that may limit direct communication between blocks 130-180. In various embodiments, blocks 130-180 may represent hardware, software or a combination of the two. Blocks 130-180 may be implemented on the same or different hardware in various suitable combinations. Further details regarding the implementation and/or operation of blocks 130-180 may be determined by referencing FIGS. 2-10 and their accompanying descriptions below.

Networks 110 and 120, in some embodiments, may be communicative platforms operable to exchange data or information. In various embodiments, the networks may include packet data networks offering communication interfaces or exchanges between any two nodes in system 100. Networks 110 and 120 may each be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, networks 110 and 120 may each include firewalls or other equipment or software that create security zones and/or secure networks such as DMZs. One or more of blocks 130-180 may be located in one more of such security zones and/or secure networks in some embodiments. For example, analysis console 170 may be in a DMZ that is separate from ingest block 130 and detection block 150. As another example, ingest block 130 may be in a different security zone than detection block 150.

As described above, embodiments of the present invention are operable to detect malware. In particular, embodiments of the present invention are operable to detect malware in one or more files. For purposes of this disclosure, a file may include one or more of the following in any suitable combination: (1) a data file; (2) a data record; (3) an email message; (4) an attachment to an email message; (5) a Uniform Resource Locator (URL) or other suitable address identifier; and (6) any other suitable target object for which malware detection may be appropriate.

In operation, in various embodiments, ingest block 130 may receive a file or set of files from network 110. In some embodiments, a file may include several files embedded within the file. For example, a ZIP file or other archive or compressed file type, may be received by ingest block 130. Ingest block 130 may extract and cause to be analyzed the files that are contained within the received ZIP file. Ingest block 130 may analyze the file(s) and determine one or more tests that should be performed on the file(s) in order to determine whether the file is malware. Detection block 150 may perform the test(s) that were determined by ingest block 130 in accordance with scheduling performed by scheduler block 140. Disposition block 160 may utilize the results of the tests performed by detection block 150 to determine what should be done with the file(s). In some cases, disposition block 160 will send the file(s) to analysis console 170 for further review by a human analyst. In various embodiments, disposition block 160 may respond to the results of detection block 150 regardless of whether it sends the file(s) to analysis console 170. For example, disposition block 160 may determine that the file(s) should be quarantined and send the file to server block 180 to quarantine the file. In some embodiments, disposition block 160 may also determine that the file(s) are not malware and may perform suitable corresponding actions with nodes coupled to external network 110. For example, disposition block 160 may cause the delivery of a message to which the analyzed file(s) were attached in response to the determination by disposition block 160 that the file(s) are not malware.

Some or all of system 100, in various embodiments, may be utilized to detect malware in a variety of contexts. In some embodiments, accessing a "file" may comprise accessing one or more URLs. For example, aspects of system 100 may be used to detect malware in a messaging environment. Suitable messaging environments include, but are not limited to, an e-mail environment, an instant messaging environment, a peer-to-peer messaging environment, a chat environment, or other messaging environments. Aspects of system 100, in various embodiments, may also be used in contexts where files are uploaded. For example, some or all of system 100 may be utilized in File Transfer Protocol (FTP) sessions, Wiki sessions, online message boards (such as forums), or other interactive environments. Aspects of system 100 may also be used in a Web browsing context. In such a context, some or all of system 100 may analyze requested Web pages and determine if they are malicious. System 100 may be used to detect malware in these and other contexts utilizing suitable configurations of ingest block 130. For example, if the context is an e-mail context, then ingest block 130 may be configured as a Mail Transfer Agent (MTA) that is able to handle e-mail messages. Configured in this manner, ingest block 130 may analyze a message, an attachment to the message, or both the message and any attachment(s) to the message. When some or all of system 100 operates in a context where files are uploaded, such as in an FTP session, ingest block 130 may be configured to access the file(s) associated with the FTP session and perform analysis on the file(s). When aspects of system 100 are used in a Web browsing context, ingest block 130 may be configured to retrieve an address associated with an Internet site or files associated with the Internet site and analyze such items.

In some embodiments, some or all of system 100 may be provided as a service to various agents. For example, an agent analyzing traffic passing through a particular boundary of a network may transmit certain traffic (such as one or more files) to aspects of system 100 for analysis and these or other aspects of system 100 may report to the agent the results of the analysis. As another example, an agent residing on a workstation or laptop computer used by end users may similarly transmit one or more files to some or all of system 100 for analysis and receive the results of the analysis. A particular example of such an agent is a client-located module capable of analyzing the downloaded contents of web-based email (e.g., GMAIL by GOOGLE; HOTMAIL by WINDOWS, or any other suitable web-based email program). As another example, a collaborative environment such as one associated with a cross-domain document management system (e.g., RAYTHEON's CHAIN environment) may utilize this service to check files hosted on the platform for malware. In some embodiments, aspects of system 100 may be offered as a service using Web service technology, such as Javascript-based Application Programming Interfaces (APIs), Simple Object Access Protocol (SOAP) Remote Procedure Calls (RPCs), and/or other suitable network based APIs.

System 100, in various embodiments, may be configured to operate in one or more of an active mode, a passive mode, and a hybrid mode. Each of these example modes is described below in greater detail.

When operating in an active mode, system 100 may delay one or more operations while the malware process is proceeding, depending on the context in which system 100 is operating. For example, as discussed above, system 100 may operate in a messaging context such as analyzing e-mail messages. If in the active mode, system 100 may prevent the delivery of an e-mail until an attachment to the e-mail has been analyzed for malware using blocks 140-180. As another example, when system 100 is operating in an active mode in a context where files are being uploaded, system 100 may stop a file from being uploaded until the malware detection process applied to the file has been completed. Hence, in some embodiments, if a file was being uploaded to a database, the file would not be entered into the database and made available to other users or processes until the file has been analyzed by the malware detection scheme of system 100. If system 100 operates in a Web browsing context and is operating in the active mode, an Internet site may not be transmitted to a Web browser requesting the site until the site has been fully analyzed for malware by system 100. In some embodiments, ingest block 130 may be used to prevent the completion of operations until malware detection has been completed.

System 100, in various embodiments, may operate in a passive mode. While in the passive mode, system 100 may not prevent the operation of processes while a file is being detected for malware. For example, when system 100 is handling e-mail messages or their attachments and operating in the passive mode, the e-mails may continue to be processed and delivered even though the malware detection process has not been completed. As another example, when system 100 operates in the passive mode and is operating on files in a file uploading context, a file to be analyzed for malware may be uploaded, stored, and made available to other users or processes even though the system 100 has not completed analyzing the file for malware.

System 100, in various embodiments, may operate in a hybrid mode, which may comprise an ability incorporate aspects of both the passive and active modes. In one example hybrid mode, system 100 may operate in a hybrid mode for detection purposes. When a file is determined to be known malware, system 100 may switch to an active mode, preventing or delaying one or more operations while the malware process is proceeding, depending on the context in which system 100 is operating. As a particular example, when in the hybrid mode, system 100 may allow emails to be processed and delivered during the detection process; however, when an email is determined to be or include known malware, system 100 may prevent the email and/or its contents from being delivered in an active manner.

Figure 2:
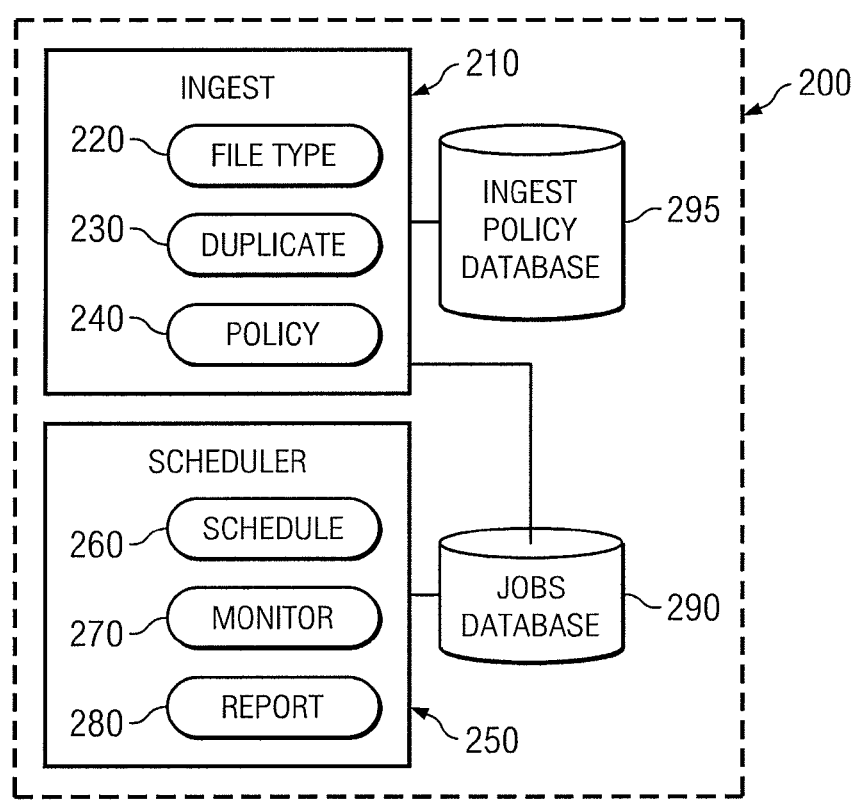
FIG. 2 illustrates one embodiment of a control module.

FIG. 2 illustrates one embodiment of control module 200. Control module 200 includes ingest module 210 and scheduler module 250. Ingest module 210 includes file type module 220, duplicate module 230, and policy module 240. Scheduler module 250 includes schedule module 260, and monitor module 270. Ingest module 210 is coupled to jobs database 290 and ingest policy database 295. Scheduler module 250 is also coupled to jobs database 290. Using ingest module 210 and scheduler module 250, control module 200 may receive a file and schedule the file for one or more malware detection schemes as further described below.

File type module 220 may be implemented using software and/or hardware and may reside on the same hardware that ingest module 210 resides upon or on different hardware. File type module 220, in some embodiments, may be configured to determine the type of file that ingest module 210 receives. File type module 220 may determine the type of a file using any suitable methods in combination or separately. For example, file type module 220 may examine an extension associated with the file to determine the type of the file. As another example, file type module 220 may examine portions of the file in order to determine its type. File type module 220 may look at characters in a header of a file to determine its type. Such characters may be referred to as magic numbers or magic bits. In this manner, in some embodiments, file type module 220 may detect the correct type of the file even if the file's extension has been removed or changed. As another example, for certain types of files (e.g., MICROSOFT OFFICE files), may determine the file type based on both magic number(s) and the file extension, possibly examining the magic number(s) prior to examining the file extension.

In various embodiments, duplicate module 230 may be implemented using software and/or hardware and may reside on the same hardware as ingest module 210 or on different hardware. Duplicate module 230 may be configured to determine whether a file has been previously analyzed for malware. Duplicate module 230 may use one or more techniques to determine if a file has been previously analyzed for malware. For example, duplicate module 230 may perform generate one or more hashes of the file (such as a checksum, an MD5 hash, and/or a SHA1 hash). These value(s) may be compared to a database containing hash values of previously analyzed files. If the hash value is in the database duplicate module 230 may determine that the file has been previously analyzed. If the hash value is not present in the database duplicate module 230 may determine that the file has not been previously analyzed. In some embodiments, duplicate module 230 may use the name of the file and/or its extension, as well as variations on those items, to determine if the file has been previously analyzed.

If it is determined that a file has been analyzed previously, malware detection schemes may not be applied to the file; instead, the results of the previous analysis of the file may be determined using a database that contains results of a previous analysis of the file. If the results indicate that the file is known not to be malware, then the analysis of the file may end. If it is determined that the file was previously determined to be malware, then it may be determined that the file should be quarantined. If it is determined that the file has been previously received and is currently going through analysis (including review by human analysts), then action may be taken once the outcome of the ongoing analysis is known. In some embodiments, this may allow for more efficient utilization of the resources that perform the malware detection schemes on the files and may reduce the workload of the human analyst.

Policy module 240, in various embodiments, may be implemented using software, hardware or a combination of the two. Policy module 240 may reside on the same hardware as ingest module 210 or it may reside on separate hardware. In some embodiments, policy module 240 may be used to determine whether a file received by ingest module 210 should undergo malware detection and/or which malware detection schemes should be applied to a file received by ingest module 210. Policy module 240 may be configured to access ingest policy database 295 to make such determinations, in various embodiments.

For example, policy module 240 may determine that a file received by ingest module 210 is a plain text file. Policy module 240 may then access ingest policy database 295 and retrieve one or more policies associated with plain text files. A retrieved policy may indicate that plain text files are not to be analyzed for malware. As a result, the plain text file may be ignored.

As another example, policy module 240 may determine that a file received by ingest module 210 is a document created by the MICROSOFT WORD application. Policy module 240 may then access ingest policy database 295 and retrieve one or more policies associated with MICROSOFT WORD documents. Policy module 240 may examine the retrieved policy or policies and determine that the received file should be analyzed for malware. Policy module 240 may also examine the retrieved policy or policies and determine the malware detection schemes that should be applied to the MICROSOFT WORD document. Policy module 240 may then create entries in jobs database 290 consistent with the determined malware detection schemes.

In some embodiments, policy module 240 may also determine that the file should be accessed by different versions of software. Versions of software may include different versions of application used to access the file or may include using different versions of an operating system used to access the file. For example, if the file is a MICROSOFT WORD document, it may be determined that a different version of MICROSOFT WORD should be used to access the file. As another example, if the file is an image file such as a JPEG file, then it may be determined to access the file using different image applications such as ADOBE PHOTOSHOP and MICROSOFT INTERNET EXPLORER. As another example, if the file is a URL, then it may be determined to access the file using different vendor's version of a browser such as MICROSOFT INTERNET EXPLORER, MOZILLA FIREFOX, APPLE SAFARI, and any other suitable browsers. In some embodiments, determining to access the file using a variety of versions of software may provide for a more robust malware detection scheme.

Schedule module 260, in various embodiments, may be implemented using software, hardware or a combination of the two. Schedule module 260 may reside on the same hardware as scheduler module 250 or it may reside on separate hardware. Schedule module 260, in some embodiments, may determine the order in which jobs in jobs database 290 are performed. Schedule module 260 may maintain a list of detection nodes that can receive the jobs and may assign the jobs using any suitable method. For example, schedule module 260 may use a first-in-first-out (FIFO) algorithm to assign jobs to detection nodes. Jobs may also be prioritized. For example, schedule module may use a FIFO approach to schedule jobs initially, but it may be determined to prioritize one job over another in response to results provided by the detection nodes. Schedule policies may be used by schedule module 260 to determine how to schedule jobs and how to prioritize jobs. Priorities for jobs, in some embodiments, may also be determined based on the context associated with the file. For example, if the file undergoing analysis was part of an e-mail attachment, it may be prioritized higher than other files.

In some embodiments, when adding a new malware detection scheme, policies used by schedule module 260 may need to be modified. The interface may require information to be entered regarding how the malware detection scheme should be applied. Such information may be entered using a tabbed interface, a wizard-style interface, or other interfaces for entering information. The information required to be entered may include how jobs should be prioritized based on responses from detection nodes, the context associated with the file, what detection nodes are involved in implementing the malware detection scheme, and/or other items associated with applying a malware detection scheme.

Monitor module 270, in various embodiments, may be implemented using any suitable combination of software and hardware. Monitor module 270 may reside on the same hardware as scheduler module 250 or it may reside on separate hardware. Monitor module 270 may be able to monitor the capacity of detection nodes that apply various malware detection schemes to a file. In some embodiments, monitor module 270 may query the detection nodes to determine their status. Example status responses may include "offline" and/or "busy." In some embodiments, monitor module 270 may determine if a detection node has taken too long to analyze a file. Monitor module 270 may be able to reboot or restore aspects of detection nodes. In various embodiments, monitor module 270 may be able to reconfigure a detection node so that the detection node may perform a different type of analysis. This reconfiguration may be performed in response to the types of files that are scheduled to be analyzed. In some embodiments, this reconfiguration capability may provide an advantage in that detection nodes may be utilized efficiently and files may be analyzed faster.

Monitor module 270 may also be able to determine when the capacity of the detection nodes reaches a critical threshold. Schedule module 260 and/or monitor module 270 may ensure that detection nodes do not pass critical thresholds. Monitor module 270 may also be able to determine when the load on the detection nodes decreased below a critical threshold. Monitor module 270 may also be able to establish various thresholds regarding the capacity of detection nodes and may be able to determine when the load of the various detection nodes has gone below any of the thresholds. For example, the ability to monitor thresholds and take appropriate action in response to the monitoring may be particularly useful in determining when to switch between one or more modes of operation, such as the active, passive, and hybrid modes. As a particular example, if a particular detection node is determined to be too busy (e.g., exceeds a capacity threshold) and that particular detection node is in active mode, it may be appropriate to switch the particular detection node to passive mode to avoid significant processing delays.

Databases 290 and 295 may be implemented using a variety of database structures. The databases may be row-oriented or column-oriented. They may include relational databases and/or object-oriented databases. Databases 290 and 295 may be indexed and accessed in a variety of manners, including by utilizing an operating system or through one or more networks. In some embodiments, databases 290 and 295 may be implemented in one database such that separate tables within the database may be used to store the information contained in databases 290 and 295.

In some embodiments, jobs database 290 stores jobs related to apply malware detection schemes to a file. A job stored in the database may include information such as an identifier associated with the file, information regarding what type of malware detection test that should be applied to the file, and the priority associated with the job. Jobs database 290 may be configured so that it can be accessed by ingest module 210 and scheduler module 250. Ingest module 210 may insert jobs into the job database and scheduler module 250 may read the jobs database to determine which jobs need to be assigned to malware detection nodes.

In some embodiments, ingest policy database 295 may contain a set of policies that determine what malware detection schemes should be applied to various types of files. The policies may be applied by type of file or other suitable criteria. Malware detection schemes employed by the policies may include classification schemes (such as recognizing generic suspect patterns), signature-based detection schemes (such as those looking for specific byte patterns), meta-data detection schemes, as well as behavior-based detection schemes. The behavior-based detection scheme specified by the policies may include accessing the file in a virtual or real environment.

In various embodiments, the policies specify the type of access applied to the files based on the file type. For example, if the file type is an executable file type accessing the file may include executing the file within a virtual environment. As another example, if the file type is a MICROSOFT WORD document the policy may specify that accessing the file within the virtual environment includes opening the file using MICROSOFT WORD or using various versions of MICROSOFT WORD or using various versions of other word processors that are also able to access a MICROSOFT WORD document. If handling URLs, for example, accessing the file may include using one or more different browsers, such as MOZILLA FIREFOX and OPERA, to access a web page located at the address provided by the URL. A variety of suitable applications may be used to access the files. Policies may also specify different types of virtual environments that should be used when accessing the file. For example, policies may specify that the file should be accessed within one or more versions of the WINDOWS operating system, within a version of an operating system using the LINUX kernel, within a version of the MAC OS operating system, within versions of operating systems using the BSD kernel, within a version of an embedded operating system, within a version of a non-conventional operating system (e.g., a mobile operating systems such as those used in smart phones), and/or within other versions of any other suitable operating systems or computing environments. Other suitable forms of malware detection schemes can be stored and applied in the policies.

In some embodiments, when adding a new malware detection scheme, an interface may be provided to modify one or more policies of ingest policy database 295. The interface may require information to be entered regarding how the malware detection scheme should be applied. Such information may be entered using a tabbed interface, a wizard-style interface, or other suitable interfaces for entering information. The information required to be entered may include: the file types that should be associated with the new malware detection scheme, identifiers associated with the detection nodes that implement the new malware detection scheme, jobs to be carried out when implementing the new malware detection scheme, and/or other items associated with applying a malware detection scheme. In some embodiments, a policy may be developed that handles files for which the file type is unknown or files for which the file type is not associated with any specific policy. Suitable malware detection schemes may be applied to such files, such as one or more of classification schemes, signature-based schemes, and behavior-based schemes.

In operation, control system 200 may be able to receive a file for malware detection and use ingest module 210 to determine what malware detection schemes should be applied to the file. File type module 220 may determine the file type and duplicate module 230 may determine whether or not the file has been previously analyzed. If the file has not been previously analyzed, policy module 240 may access a policy in ingest policy database 295. Policy module 240 may use the accessed policy to determine a set of malware detection schemes that should be applied to the file based on the file type. Policy module 240 may then enter jobs into jobs database 290 in order to implement the determined malware detection schemes. Scheduler module 250 may then schedule and monitor the application of the determined malware detection schemes to the file. Schedule module 260 may assign the jobs in jobs database 290 to one or more detection nodes.

Monitor module 270 may monitor the load applied to the detection nodes and determine if the load has surpassed a critical value or threshold. In response to passing the threshold, monitor module 270 may report this occurrence. As a result, the system may switch from operating in an active mode to operating in a passive mode. This may be advantageous, in various embodiments, because the time it takes to complete an analysis of a file may depend on the load present on the detection nodes. For example, if the system is operating in an active mode and files are entering the system at a rate above a particular threshold, messages or other services may be disrupted causing a lower quality of service. By switching into a passive mode, the system may allow the analysis of the file to proceed without lowering the quality of service of services associated with the file being analyzed. For example, certain malware detection schemes may proceed in real-time (e.g., signature-based or classification-based analysis) while others (e.g., behavior-based analysis) may be delayed. If the detection schemes proceeding in real-time did not cause an alert, then other analyses may be delayed. If the detection schemes proceeding in real-time did cause an alert, then other jobs associated with the file may be given greater priority in the jobs queue. If the load on the detection nodes falls below a critical threshold, monitor module 270 may report this occurrence. In response, the system may enter into an active mode of operation which may allow, in some embodiments, for greater security since operations associated with the context of the file are delayed while the analysis of the file is proceeding. As another example, in a hybrid mode, files determined to be known malware may delayed or removed from the mail stream while files determined not determined to be known malware may not be delayed or removed from the mail stream.

Figure 3:
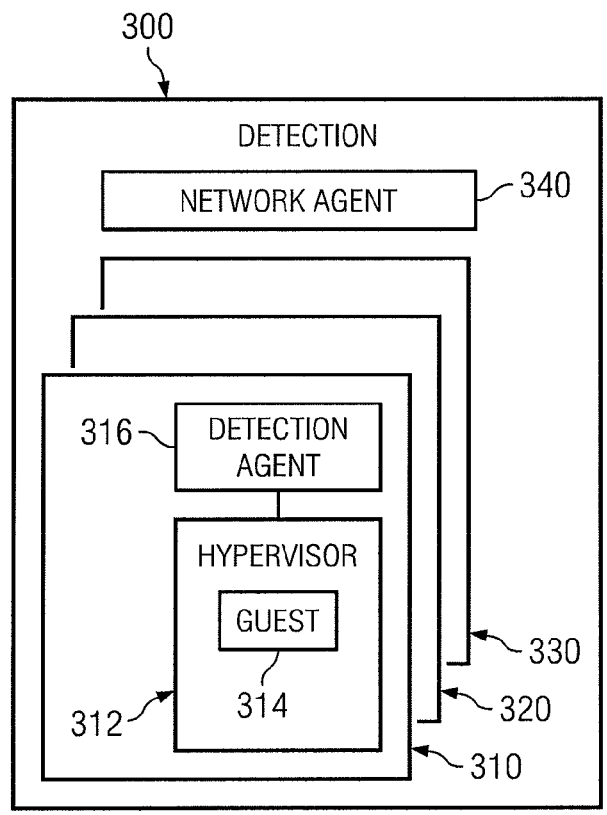
FIG. 3 illustrates one embodiment of a detection subsystem.

FIG. 3 illustrates one embodiment of detection subsystem 300. Detection subsystem 300 includes detection nodes 310, 320 and 330 and network agent 340. Detection node 310 includes hypervisor 312, one or more guest operating systems (GOS) 314 and detection agent 316. Subsystem 300 may be used to apply malware detection schemes to a file (including, for example, a URL).

In some embodiments, detection nodes 310-330 may conform to an interface standard for applying malware detection. Such an interface may include standards for one or more of the following: specifying the file (including, possibly, a URL) that is to be analyzed configuration parameters for applying the detection scheme, time limit for completing the analysis, format of results, specifying the reason for indicating that an analyzed item is suspect, providing log files, and other suitable items involved with applying malware detection schemes. In some embodiments, having such an interface may be advantageous because it may allow policies to call for the application of malware detection schemes without having to give precise parameters based on the configuration of the detection node. In this manner, in various embodiments, new detection schemes may be added to the system without needing to recode various parts of the system since the detection node applying the new malware detection scheme would conform to the interface standard. For example, to add a new malware detection scheme, the detection node applying the new malware detection seem may be configured to conform to the interface standard by being configured to receive files for analysis in the same or similar manner as other configuration nodes applying other malware detection schemes. In addition, for example, the configuration node applying the new malware detection scheme may be configured to report the results of applying the new malware detection scheme in the same or similar manner as other configuration nodes applying other malware detection schemes. This, in some embodiments, may be advantageous in that it allows for the system to adapt to new malware detection schemes.

Detection nodes 310-330 may be implemented on a variety of types of hardware. They may be configured in a blade architecture or on physical hosts. Detection nodes 310-330 may also be configured utilizing clusters or other suitable distributed computing architectures. Detection nodes 310-330 may utilize virtualization or may themselves be virtual machines. Detection nodes 310-330 may be used to apply a variety of malware detection schemes to a file (which, in some embodiments, may include one or more URLs). In some embodiments, detection nodes 310-330 may be specialized such that each detection node may be configured to apply a type of malware detection scheme. For example, detection node 310 may be configured to apply behavior-based malware detection schemes while detection node 320 may be configured to apply metadata-based detection schemes where metadata of a file is analyzed. In yet another example, detection node 330 may be configured to apply signature-based detection schemes to files. As another example, nodes 310-330 may also apply classification-based detection schemes. As discussed above, detection nodes 310-330 may be configured to apply other forms of detection schemes that conform to an interface to facilitate the incorporation of new or different detection schemes. In various embodiments, subsystem 300 may include a variety of detection nodes in addition to detection nodes 310-330.

Detection agent 316 may be implemented using software. In some embodiments, detection agent 316 may be installed on detection node 310. In various embodiments detection agent 316 may reside on hardware separate from detection node 310 but in communication with detection node 310 and in particular hypervisor 312. Detection agent 316 may be configured to receive jobs that describe malware detection schemes that should be applied to a file. Detection agent 316 may also be configured to receive the file and send it to hypervisor 312 and cause hypervisor 312 to implement the malware detection scheme from the job on the file. Detection agent 316 may also be configured to monitor the execution of the malware detection scheme and report when it is completed. Detection agent 316 may report the results of the application of the malware detection scheme to the file. In various embodiments, agents such as detection agent 316 may be present in other detection nodes such as nodes 320-330 and cause those nodes to implement a variety of malware detection schemes. For example, a detection agent on detection node 320 may cause detection node 320 to implement a signature-based malware detection scheme. As another example, a detection agent on detection node 330 may cause detection node 330 to implement a metadata-based malware detection scheme on a file.

Hypervisor 312 may be implemented using various types of hypervisors such as those provided in virtualization solutions from VMWARE, PARALLELS, and XEN. In some embodiments, the KI-2 hypervisor from RAYTHEON may be employed. Hypervisor 312 may be used to apply malware detection schemes in a virtual environment. Hypervisor 312 may host GOS 314. In various embodiments, multiple guest operating systems may be hosted by hypervisor 312.

Hypervisor 312 may cause the application of malware detection schemes within GOS 314. In some embodiments, hypervisor 312 may be able to apply a malware detection scheme to a file at a configurable observation time (including, in some embodiments, in faster-than-real-time) by causing the execution to ignore wait states associated with GOS 314.

Hypervisor 312 may, in various embodiments, be able to provide near-instant reversions of GOS 314 during jobs or between jobs. This may be accomplished, for example, by maintaining a state of GOS 314 in memory and tracking changes made to GOS 314 during the execution of the malware detection scheme. The tracked changes may also be stored in memory. When the malware detection scheme is completed, GOS 314 may be reverted by undoing the changes to GOS 314 during execution of the malware detection scheme using changes stored in memory.

In some embodiments, by applying near-instant reversions and/or applying malware detection schemes at a configurable observation time, processing of files may be accomplished faster allowing the system to have a higher throughput of analyzed files. These techniques may be applied in both an active mode and a passive mode.

Hypervisor 312 may also be able to provide information regarding the execution of the malware detection scheme without running a process within GOS 314 in various embodiments. Doing so, in some embodiments, may thwart attempts by malware to detect if a malware detection scheme is being applied to the malware. For example, a file may contain malware that is configured to examine processes running in an operating system. Based on that examination, the malware may recognize certain processes as being associated with the application of malware detection schemes. As a result, in an attempt to remain undetected during the application of the malware detection scheme, the malware may change its behavior so that it does not act maliciously or otherwise abnormally. However, the malware may change its behavior once it is in a normal environment where malware detection schemes are not being applied. In some situations, monitoring of GOS 314 may occur at the machine layer so as to avoid running processes. Hence, in various embodiments, it may be advantageous for hypervisor 312 to provide monitoring of GOS 314 without running a process within GOS 314. Other suitable techniques may be applied within hypervisor 312 to hide the fact that a hypervisor is being used from an application and/or to hide the existence of an application running inside an operating system.

In various embodiments, GOS 314 may be any of a variety of virtualized operating systems. Examples of such operating systems include various versions of MICROSOFT WINDOWS, APPLE MAC OS, operating systems using the LINUX kernel, operating systems using the BSD kernel, embedded operating systems, mobile operating systems (including those used in mobile telephones or devices), or other computing environments. GOS 314 may include a variety of applications used to access different file types. Such applications may include e-mail clients, word processing applications, image viewing applications, audio applications, video applications, Internet browsing applications, e-mail applications, or other applications.

Network agent 340 may, in various embodiments, be implemented using software, hardware, or a combination of both. Network agent 340 may be configured to provide virtualized networking services to detection nodes 310-330. In some embodiments, these services include simulating a network environment and network nodes in order to facilitate the application of various malware detection schemes. For example, detection node 310 may implement a behavior-based malware detection scheme that includes accessing the file in GOS 314. Part of the malware detection scheme may include observing how accessing the file impacts a network. Network agent 340 may provide virtual networking services in order to provide the file opportunity to interact with a network. In some embodiments, the network may be simulated.

Figure 4:
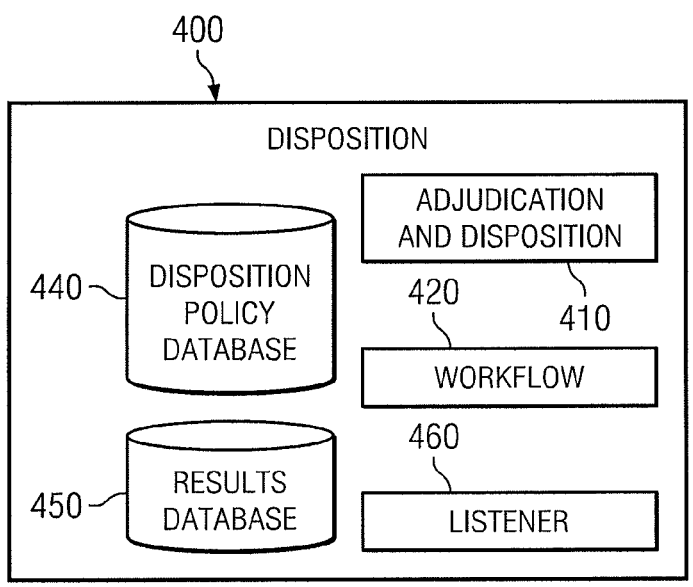
FIG. 4 illustrates one embodiment of a disposition subsystem.

FIG. 4 illustrates one embodiment of disposition subsystem 400. Disposition subsystem 400 includes adjudication and disposition module 410, workflow module 420, policy database 440, and results database 450. Each of modules 410-420 may communicate with one another as well as communicate with results database 450 and policy database 440 in various embodiments. Further details regarding the components of disposition subsystem 400 are given below and in the description of FIG. 5.

Modules 410-420 and 460 may be implemented using software, hardware, or a combination of the two. Each of modules 410-420 and 460 may be implemented on the same hardware or on different hardware. For example, modules 410-420 and 460 may each be on separate pieces of hardware.

Databases 440 and 450 may each be implemented in hardware separate from each other or on the same hardware. Databases 440 and 450 may be implemented on the same or different hardware as modules 410-420. The databases may be row-oriented or column-oriented. They may include relational databases and/or object-oriented databases. Databases 440 and 450 may be indexed and accessed in a variety of manners, including by utilizing an operating system or through one or more networks. In some embodiments, databases 440 and 450 may be implemented in one database such that separate tables within the database may be used to store the information contained in databases 440 and 450.

Adjudication and disposition module 410, in some embodiments, may analyze the outcome of malware detection schemes applied to a file to determine if the file is malware. Adjudication and disposition module 410 may access policy database 440 to select one or more adjudication policies in order to determine if the file is malware. Adjudication policies from policy database 440 may include various ways to determine how to characterize a file. In various embodiments, possible characterizations of a file may include: (1) the file is known malware; (2) the file is known not to be malware; (3) the file is suspected malware; and (4) the file is not suspected to be malware. The adjudication policies may contain rules which indicate which one of the characterizations should be applied to a file based on the results of malware detection schemes applied to the file. For example, an adjudication policy may include a weighted score that is applied to the outcomes of each of the malware detection schemes applied to the file. Based on the sum of the weighted scores, the adjudication policy may indicate the proper characterization of the file. Adjudication and disposition module 410 may determine the appropriate adjudication policy to use for the file in question, retrieve the outcomes of the malware detection schemes performed on the file, and use the adjudication policy to apply weighted scores to each of those outcomes. Adjudication and disposition module 410 may also, in some embodiments, use the sum of the applied weighted scores to characterize the file according to the adjudication policy. Although weighted scoring is described, the present invention contemplates using any suitable selection mechanism according to particular needs.

One or more adjudication policies may be chosen to evaluate the outcome of the malware detection schemes applied to the file based on a variety of factors. For example, the file's type may be used to determine what policy to select. The context from where the file came may also be used to select an adjudication policy. Examples of context include a messaging context, a file uploading context, and a browsing context as discussed above.

Adjudication and disposition module 410 may provide entries for results database 450 after determining the characterization to use for the file. For example, if the weighted score determined by adjudication and disposition module 410 leads adjudication and disposition module 410 to characterize the file as malware according to a selected policy, adjudication and disposition module 410 may create an entry in results database 450 which include any or all of the following items: the name of the file, the type of the file, a hash value associated with the file, the individual scores applied to the file, the sum of the scores applied to the file, the adjudication policy applied to the file, and the characterization applied to the file.

In some embodiments, workflow module 420 may determine a workflow for use by a human analyst to review the file. A file may need to be reviewed by a human analyst based on the characterization of the file determined by adjudication and disposition module 410. For example, if adjudication and disposition module 410 characterizes the file as suspected malware then a human analyst review the file to determine if it is malware. As another example, if the file is determined to be malware rather than merely to be suspected malware, a human analyst may review the file in order to learn more about the malware in the file and/or to start an incident response review (e.g., to clean up the file). In such and other scenarios, workflow module 420 may determine tasks associated with reviewing the file. In some embodiments, workflow module 420 may generate a set of tasks to be performed by a human analyst reviewing the file based on a variety of factors. Such factors could include the type of file being reviewed and the characterization of the file by adjudication and disposition module 410. Other factors may include whether the system is operating in a passive or an active mode. For example, if operating in an active mode, a determination that the file is suspected malware may invoke an advanced malware analysis workflow to be followed by a human analyst. As another example, if the file is determined to be known malware, then workflows associated with cleaning up the environment(s) the file has been in as well as other incident response workflows (e.g., notifying a user or an administrator) may be determined. Other suitable workflows may be generated based on these or other suitable factors.

Workflow module 420 may, in various embodiments, automatically perform certain tasks associated with reviewing the file by a human analyst to facilitate the review of the file by the human analyst. For example, it may be determined that in order for a file to be properly reviewed by a human analyst, all strings in the file should be extracted. Workflow module 420 may automate this procedure such that it is already performed for the human analyst when they receive the task. Workflow module 420 may also provide a priority associated with the review of the file. For example, if the file has already been determined to be malware, a lower priority may be assigned to the review of the file compared to a file that is suspected of being malware. Also, based on the characterization and/or the mode the system is operating in, entirely different workflows may be generated for the file or the file may be placed in different queues. In various embodiments, workflow module 420 may be configured to interact with an analysis console (e.g., analysis console 170) to facilitate the creation and operation of the workflows. Policies stored in policy database 440 may also contain information on workflows to be applied to files based on their characterization. Workflow module 420 may, in some embodiments, access policy database 440 in order to determine the workflow that should be applied to the file. In various embodiments, workflow module 420 may receive one or more disposition policies that may be used to determine the workflow from adjudication and disposition module 410, as further discussed below.

In some embodiments, adjudication and disposition module 410 may perform operations associated with the context of the file in response to the characterization of the file determined by adjudication and disposition module 410. As discussed above, a file may come from a variety of contexts including a messaging context, a browsing context (this context may include processing URLs), or a file uploading context. The characterization of the file may cause certain operations to be performed related to the context of the file. For example, if the file came from a messaging context (e.g., the file was an attachment to an e-mail), the characterization of the file may cause effects on the e-mail from which the file was extracted. It may be determined whether the e-mail should be delivered based on the characterization of the file. As another example, if the system were analyzing a URL, the context of where the URL was found may affect the operations performed. If the URL was found in the body of an e-mail message, for example, the message may be prevented from being delivered. On the other hand, if the URL was found in the body of an attachment to the e-mail message, the message may be delivered but, optionally, the attachment may be stripped and/or the URL may be removed. As another example, in certain embodiments, regardless of the context in which the URL is found, if the URL is determined to be associated with malware, the message may not be delivered. Adjudication and disposition module 410 provides functionality that allows for these types of operations to be performed.

In various embodiments, adjudication and disposition module 410 may take the mode that the malware detection system is operating in into account when determining actions to perform. For example, if the malware detection system is operating in a passive mode and the file is characterized as malware, adjudication and disposition module 410 may cause an alert to be sent to an administrator that the file has been characterized as malware. As another example, if the file was attached to an e-mail message and the malware detection system was operating in an active mode, then characterizing the file as not being malware would cause the adjudication and disposition module 410 to indicate that the e-mail should be delivered. In various embodiments, adjudication and disposition module 410 may refer to one or more disposition policies in policy database 440 to determine one or more actions to be taken as a result of the characterization.

In some embodiments, when adding a new malware detection scheme, an interface may be provided to modify one or more adjudication or disposition policies of policy database 440. The interface may require information to be entered regarding how the malware detection scheme should be applied. Such information may be entered using a tabbed interface, a wizard-style interface, or other suitable interfaces for entering information. Such information may include: weighted scoring algorithms to apply to responses from detection nodes, workflows that may be generated based on the response of the detection nodes, thresholds or ranges that determine how the file should be characterized based on the response of the detection nodes, actions that should occur based on the characterization of the file, and/or other items associated with a malware detection scheme. In some embodiments, the interface may allow for new actions to be defined that would respond to characterizations of the file. A modular architecture may be utilized where new actions would be able to be "plugged in" to the system so that disposition policies may be easily modified or added.

Listener module 460, in various embodiments, may be implemented using software, hardware or a combination of the two. Listener module 460 may be able to determine when jobs assigned to detection nodes are complete and report the completed status. In some embodiments, the results of listener module 460 may be used by monitor 270 to determine the load of the detection nodes. In some embodiments, listener module 460 may be contacted by a detection node once it has completed analyzing a file and receive the results of the analysis. Listener module 460 may determine when the job has been completed and report the results of completed jobs. In some embodiments, listener module 460 may store the results of the jobs in results database 450. Listener module 460 may increase the priority of jobs in jobs database 290 based on the reported results of completed jobs. For example, if a file has been scheduled to have five malware detection schemes applied to the file and one of the malware detection schemes has reported that there is a high likelihood that the file is malware, listener module 460 may increase the priority of the jobs associated with this file.

Figure 5:
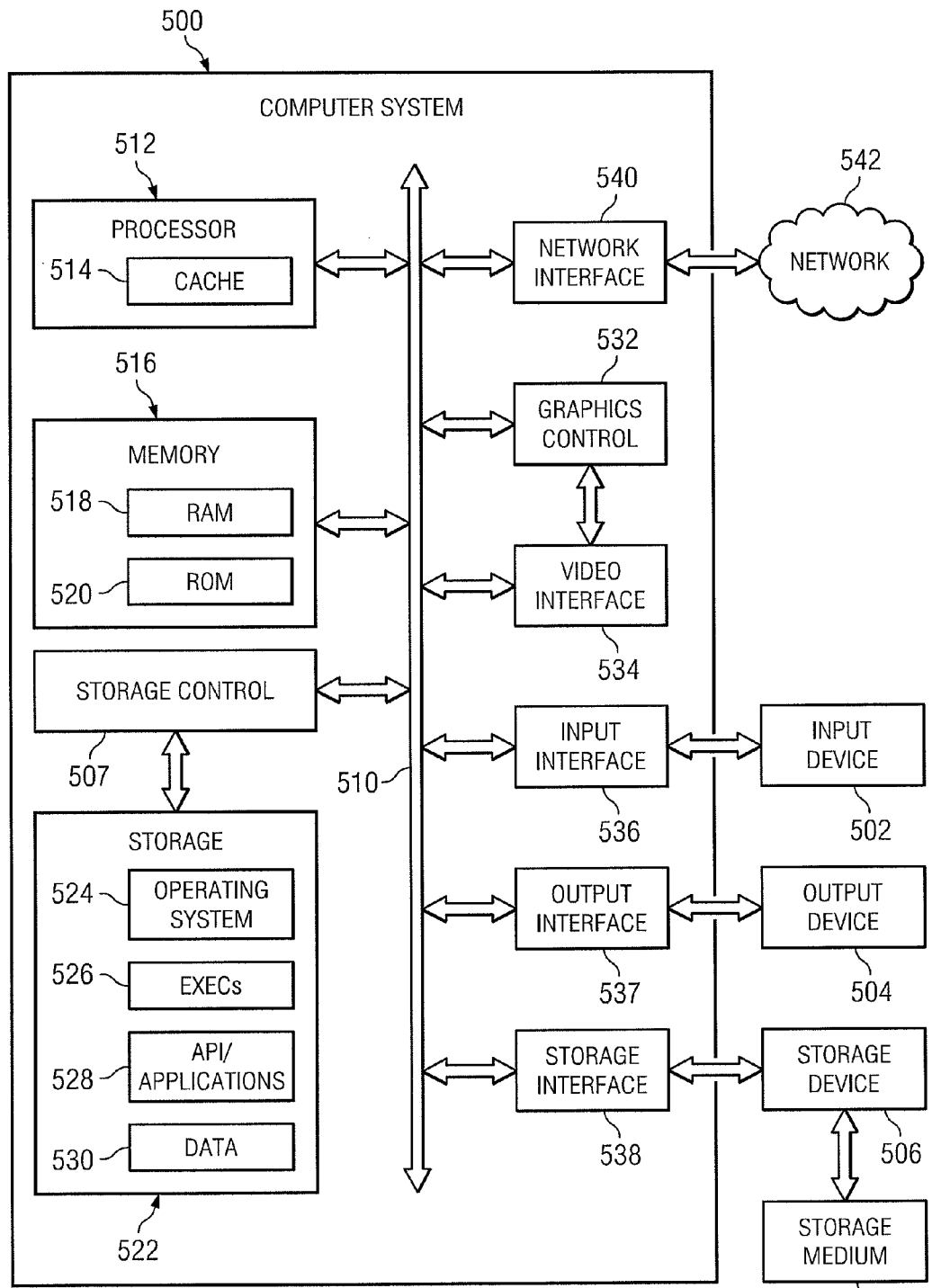
FIG. 5 illustrates an example computer system suitable for implementing one or more portions of particular embodiments.

FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Blocks 130-180 of FIG. 1 as well as the elements discussed in FIGS. 2-4, 11, and 13 may be implemented using all of the components, or any appropriate combination of the components, of computer system 500 described below.

Computer system 500 may have one or more input devices 502 (which may include a keypad, keyboard, mouse, stylus, or other input devices), one or more output devices 504

(which may include one or more displays, one or more speakers, one or more printers, or other output devices), one or more storage devices 506, and one or more storage medium 508. An input device 502 may be external or internal to computer system 500. An output device 504 may be external or internal to computer system 500. A storage device 506 may be external or internal to computer system 500. A storage medium 508 may be external or internal to computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 512 (or central processing units (CPUs)). A processor 512 may contain a cache 514 for temporary local storage of instructions, data, or computer addresses. Processors 512 are coupled to one or more storage devices, including memory 516. Memory 516 may include random access memory (RAM) 518 and read-only memory (ROM) 520. Data and instructions may transfer bidirectionally between processors 512 and RAM 518. Data and instructions may transfer unidirectionally to processors 512 from ROM 520. RAM 518 and ROM 520 may include any suitable computer-readable storage media.

Computer system 500 includes fixed storage 522 coupled bi-directionally to processors 512. Fixed storage 522 may be coupled to processors 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In some embodiments, fixed storage 522 may include network resources, such as one or more storage area networks (SAN) or network-attached storage (NAS).

Processors 512 may be coupled to a variety of interfaces, such as, for example, graphics control 532, video interface 534, input interface 536, output interface 537, and storage interface 538, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processors 512 to another computer system or to network 542. Network interface 540 may include wired, wireless, or any combination of wired and wireless components. Such components may include wired network cards, wireless network cards, radios, antennas, cables, or any other appropriate components. With network interface 540, processors 512 may receive or send information from or to network 542 in the course of performing steps of particular embodiments. Particular embodiments may execute solely on processors 512. Particular embodiments may execute on processors 512 and on one or more remote processors operating together.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processors 512 may access an incoming or outgoing packet in memory 516 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 516 may include one or more tangible, computer-readable storage media embodying software and computer system 500 may provide particular functionality described or illustrated herein as a result of processors 512 executing the software. Memory 516 may store and processors 512 may execute the software. Memory 516 may read the software from the computer-readable storage media in mass storage device 516 embodying the software or from one or more other sources via network interface 540. When executing the software, processors 512 may perform one or more steps of one or more processes described or illustrated herein, which may include defining one or more data structures for storage in memory 516 and modifying one or more of the data structures as directed by one or more portions the software, according to particular needs.

In some embodiments, the described processing and memory elements (such as processors 512 and memory 516) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

FIGS. 6-10 are flowcharts that illustrate various embodiments of the operation of a malware detection system. In general, the steps illustrated in FIGS. 6-10 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-5.

Figure 6:
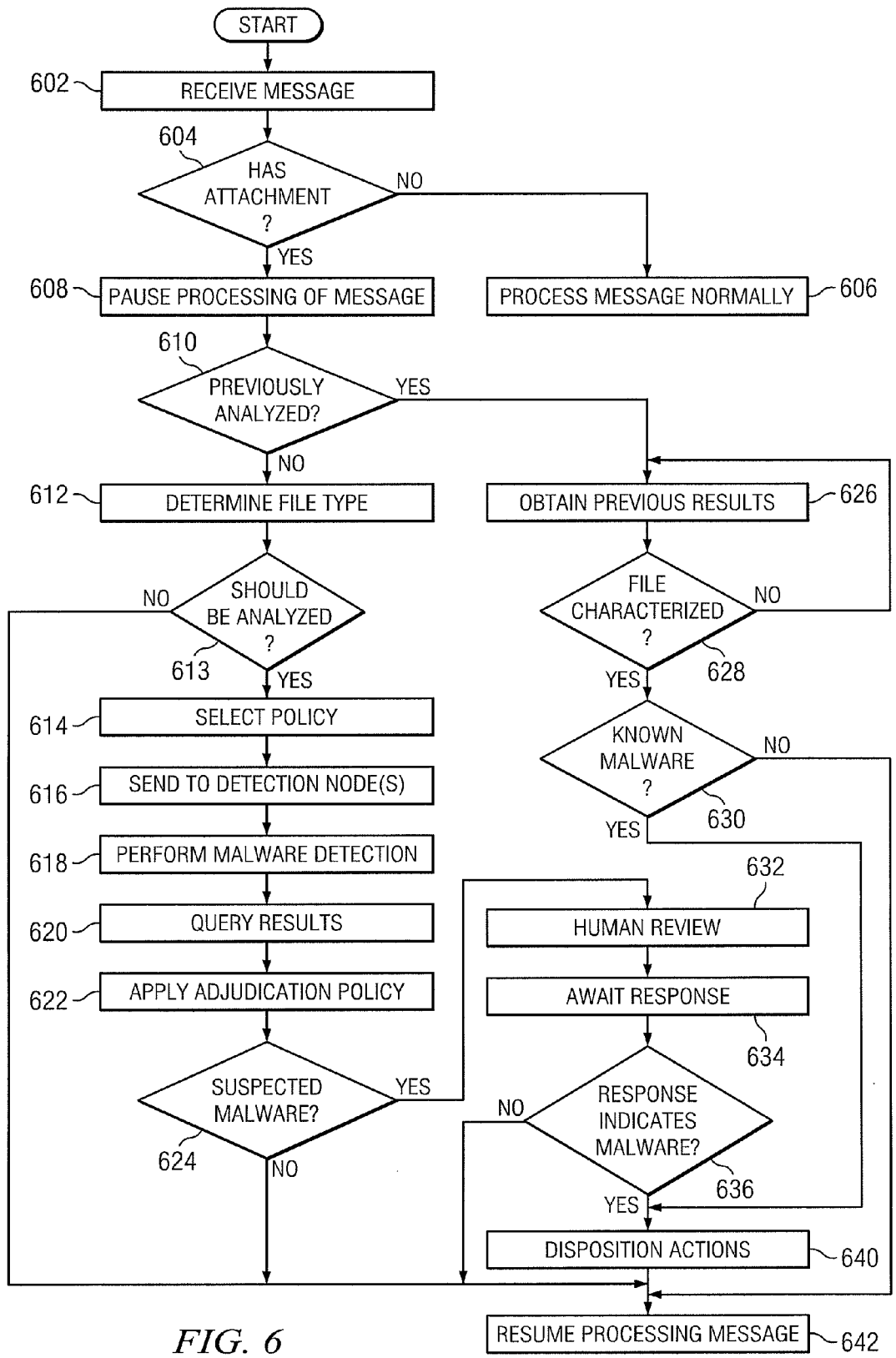
FIG. 6 is a flowchart illustrating one embodiment processing an e-mail attachment in a malware detection system operating in an active mode.

FIG. 6 is a flowchart illustrating one embodiment of how an e-mail attachment may be processed by a malware detection system operating in an active mode. As described further below, the steps described in this example may be applied to other contexts, such as the browsing context (e.g., processing URLs) or the service context (e.g., receiving one or more files to be processed by a security agent on a desktop or network boundary).

At step 602, in some embodiments, a message is received. The message may be an e-mail message that is received by an e-mail server. At step 604, it may be determined whether the message has an attachment. In some embodiments, if the message does not have an attachment, then the message may be processed normally, such as at step 606. This type of processing may include delivering the message to the recipient. If the message does have an attachment, then the system may proceed to step 608. In some embodiments, the determination at step 604 may also include determining if the body of the message includes items that may need to be analyzed, such as a URL. If such an item exists, then the system may proceed to step 608.

At step 608, in some embodiments, the processing of the message by an e-mail delivery system may be paused. This may be done because the malware detection system operating in an active mode. By pausing the processing of the message, the message may be prevented from being delivered. A copy of the message as well as the attachment may be created and sent to the malware detection system. In various embodiments, the message and the attachment themselves may be sent to the malware detection system without creating a copy. These actions may be performed or facilitated by an agent that communicates both with the malware detection system and the messaging system. In contexts other than e-mail, other underlying processes or services may be paused. For example, if the context is uploading files to a network location, the uploading process may be paused while the system analyzes the files as further described below.

At step 610, the file attached to the message may be analyzed to determine if it has been previously analyzed by the malware detection system. This determination, in some embodiments, may be made by creating a hash of the file and comparing the hash to a database that contains the results of applying the malware detection system to various files. The step may be performed utilizing a module such as duplicate module 230 of FIG. 2 and a database such as results database 450 of FIG. 4 in various embodiments. If it is determined that the file has been previously analyzed then the system may proceed to step 626. However, if the file has not been previously analyzed the system may proceed to step 612.

At step 612, the type of the file may be determined. This may be accomplished by analyzing the extension of the file and/or by examining a header of the file. This step may be performed by items such as file type module 220 of FIG. 2 in various embodiments. At step 613, in some embodiments, it may be determined if the file should be analyzed. This determination may occur based on the determined file type. For example, it may be determined that plain text files are not to be analyzed. If the file should not be analyzed, then the system should proceed to step 642. If the file should be analyzed, then the system should proceed to step 614.

At step 614, the determined file type may be used to select a policy that contains procedures to be followed when analyzing the file. These procedures may include determining what types of malware detection schemes to apply to the file. More than one policy may be selected at this step. The policy may contain more than one malware detection scheme to apply to the file. For example, the policy may indicate that the file should be accessed by several versions of an application in a virtual environment or the policies may indicate that the file should be analyzed using signature based analysis to determine if it is malware. Classification-based analysis may also be performed in various embodiments. Elements such as policy module 240 of FIG. 2 may be utilized to perform this step in various embodiments.

At step 616, in some embodiments, jobs associated with malware detection schemes may be sent to detection nodes. The jobs may be determined in accordance with policies selected at step 614. The jobs may be entered into a database and a scheduler may determine when jobs are sent to the detection nodes in accordance with the malware detection schemes determined at step 614. The scheduler may operate in a first-in-first-out (FIFO) mode where jobs that are first entered into the database are the first ones to be assigned to available detection nodes. Schedule module 260 of FIG. 2 is an example of how this step may be performed in various embodiments.

At step 618, in some embodiments, malware detection may be performed on the file. This may be performed by one or more detection nodes. A variety of malware detection schemes may be applied during this step. Each of these malware detection schemes may be applied at different nodes or at the same node, and they may be applied concurrently or sequentially or a combination of the two. Malware detection schemes may include performing behavior-based analysis, signature-based analysis, or metadata-based analysis. Items such as detection subsystem 300 of FIG. 3 may, in some embodiments, be used to implement this step. At step 620, a query for the results of the detection nodes applying the malware detection schemes determined by the policy may be performed. The results may be received as each detection node completes its job or after all of the detection nodes have completed their jobs in accordance with the set of malware detection schemes to be applied to the file. Listener module 460 of FIG. 4, in various embodiments, may provide an example for how this step may be implemented.

At step 622, in some embodiments, an adjudication policy may be applied to the results determined at step 620. In some embodiments, the adjudication policy may use scores that may be based on the type of file being analyzed as well as the malware detection scheme applied to the file. The scoring may be weighted in various embodiments. At step 624, it may be determined whether or not the file is suspected malware. This may be done in accordance with the adjudication policy or policies accessed at step 622. If the file is determined to be suspected malware, the system may proceed to step 632. If the file is determined not to be suspected malware the system may proceed to step 642. Adjudication and disposition module 410 of FIG. 4, or similar structures, may be used to implement steps 622 and 624 in various embodiments.

At step 626, in some embodiments, the results of a previous malware analysis performed on the file are obtained. This may be done in response to determining that the file has been previously scanned at step 610. These results may be retrieved from a database such as results database 450. The results may include a determination of whether the file was considered to be: known malware, suspected malware, not malware, or not suspected as malware. The results of the adjudication policy or policies applied to the file may also be retrieved. Performing step 626, in some embodiments, may conserve resources and/or provide faster processing of a file because a file that has been previously analyzed may not need to be reanalyzed.

At step 628, the results are analyzed to determine if the analysis on the file has been completed and a characterization of the file has been determined. If a characterization of the file is not available, then step 626 may be performed. In some cases, the system may continue to perform steps 626 and/or 628 until a determination that the file is either known to be malware or known not to be malware is completed. If a characterization is available, then step 630 may be performed. At step 630, the characterization of the file that was previously determined is examined. If the file was previously adjudicated as known malware, then step 640 may be performed. If the file was previously adjudicated as not being malware, then step 642 may be performed.

At step 632, in some embodiments, the file may be sent for review by human analysts. This may be done in response to determining that the file is suspected malware as in step 624. Along with the file, in various embodiments, a workflow for human analysts may be invoked in accordance with the results of the application of malware detection schemes to the file, the file type, and any other suitable information. In addition to the tasks in a workflow being invoked, a set of those tasks may be automatically performed before the human analyst receives the workflow package in various embodiments. Workflow module 420 of FIG. 4 may be an example of how such functionality may be provided. At step 634, a response from the human analyst may be waited for before proceeding. At step 636, a response from the human analyst may be received and analyzed. If the response indicates that the file is malware, step 640 may be performed. If the response from the human analyst indicates that the file is not malware, step 642 may be performed.

At step 640, actions may be performed based on a determination that the file is known to be malware or suspected to be malware. These actions may be determined based on one or more disposition policies. For example, such actions may include removing the file, sanitizing the file, quarantining the file, and/or sending the file for review by human analysts. The actions may be done in response to obtaining the results of a previous analysis of the file, a response from human analysts, or the application of an adjudication policy based on results returned by detection nodes applying various malware detection schemes to the file. For example, in the messaging context, an indication that the attachment should be removed may be sent to a mail server or agent, which may then remove the attachment from the message that is to be delivered at this step. In some embodiments, actions such as removing attachments from messages may be performed by the system and the modified message may be sent back to a mail server or agent for delivery or an edited message may be sent by the system. As another example, if the system was being used as a service by another entity (such as a desktop or network security agent), a report may be sent to the entity that may include the adjudication as well as the results from the detection nodes. In some cases, a sanitized version of the file(s) may be sent to the entity using the system as a service. Adjudication and disposition module 410 of FIG. 4, in some embodiments, may be an example for how step 640 may be implemented.

In some embodiments, a determination may be made at step 640 that waits for other files to be completely processed before performing any actions. Prioritizing the jobs associated with other files that are still being analyzed may occur at this step in various embodiments. This prioritization may occur, for example, if one file of a group of files being processed has been determined to be known malware or suspected malware. As a result of such a determination, the other files part of the group may have their analysis prioritized. In the messaging context, if an e-mail attachment includes multiple files, determining what actions should be performed on one file may be based on the characterization of the other files. As a result, it may be determined that actions should not be performed until all the files have been analyzed.

In some embodiments, workflows for human analysts may be determined and invoked during this step. Such workflows may include sending a file determined to be or suspected to be malware to a human analyst for further analysis. The workflows may also include actions associated with incident response. For example, if a file has been determined to be malware, several actions involving human interaction may be helpful. These may include items such as contacting relevant personnel or administrators, taking precautionary measures to secure network and computing resources, or other suitable actions depending on the context associated with the file.

At step 642, the message may resume being processed. In some embodiments where multiple files are being processed as a group (i.e., if there are multiple files in an attachment), this step may include waiting for the results of the analysis of other files. In some embodiments, this may occur if it is determined that the attachment does not contain malware. This step may be reached if the attachment has been determined as malware but after the attachment has been removed from the message as in step 640. Hence the processing and delivering of the message may be paused at step 608 and resumed at step 642. In some cases, a message may not be delivered at all. For example, the message may contain a URL in the body of the message that was analyzed in accordance with the steps described above. The URL may be determined to be malicious and, as a result, it may be determined that the message should not be delivered at all. This may provide enhanced messaging security, in some embodiments, since messages are not delivered until it is determined that they do not contain malware or until attachments determined to be malware are removed from the messages. In some embodiments, this step may be performed in different contexts. For example, if the system was analyzing files that were to be uploaded to a network location, this step may include allowing some or all of the files to be uploaded. If the system was invoked as a service, this step may include the entity that invoked the system as a service performing actions in response to receiving the results of the malware analysis. For example, if a desktop security agent invoked the system as a service, the agent may have received the results at step 640 and may alert the user of the desktop system of those results at step 642.

Figure 7:
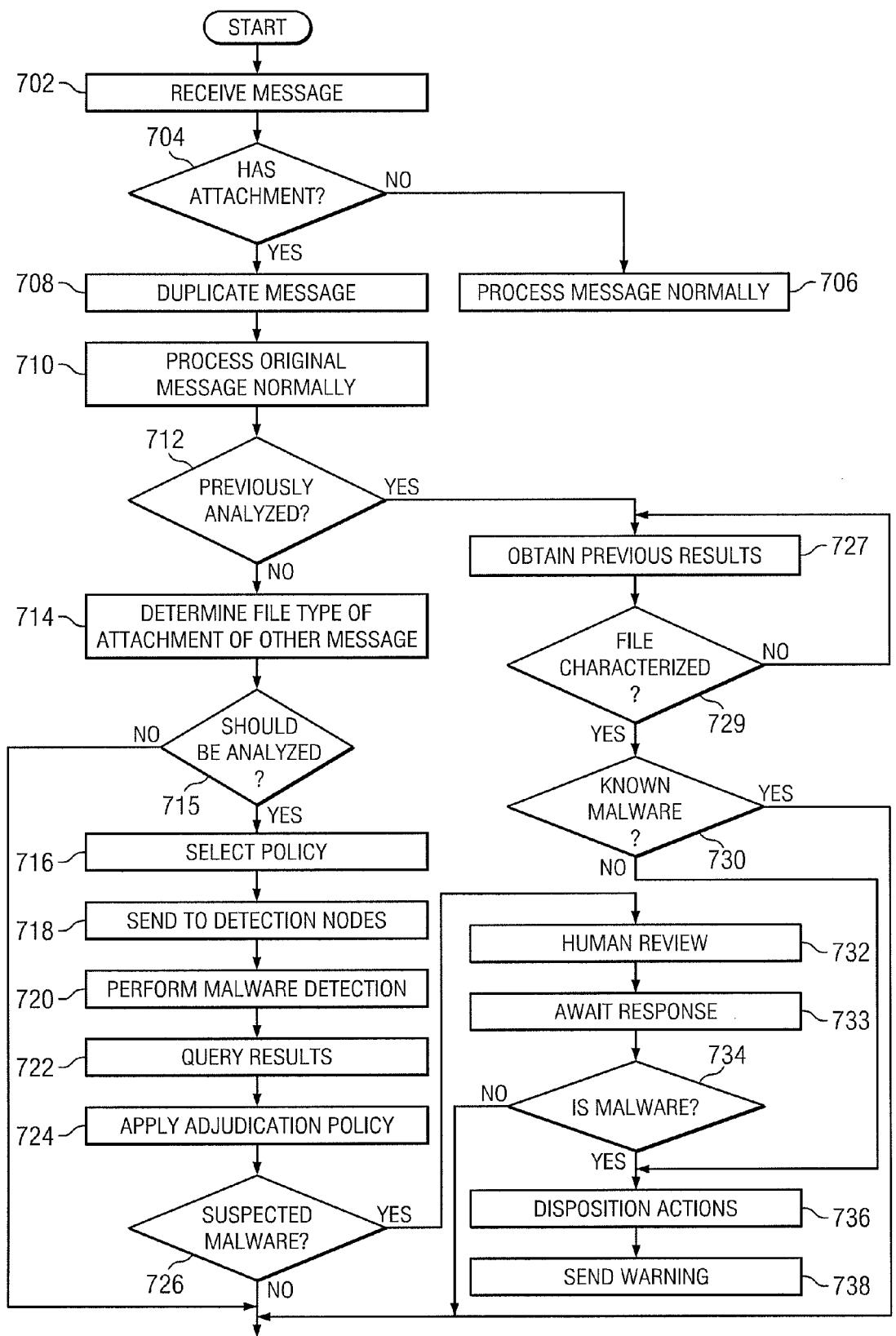
FIG. 7 is a flowchart illustrating one embodiment of processing an e-mail attachment in a malware detection system operating in a passive mode.

FIG. 7 is a flowchart illustrating one embodiment of a malware detection system operating in a passive mode to detect malware in messages such as e-mail. As described further below, the steps described in this example may be applied to other contexts, such as the browsing context (e.g., processing URLs) or the service context (e.g., receiving one or more files to be processed by a security agent on a desktop or network boundary).

Steps 702, 704, and 706, in various embodiments, may be completed in the same or in a similar manner as step 602, 604, and 606 of FIG. 6. Generally, if a determination at step 704 indicates that the message received at step 702 does not have an attachment then the message is processed normally by nodes in the messaging context at step 706. In some embodiments, a determination may be made at this step if the body of the message contains items that need to be analyzed, such as URLs. If not, then the message is processed normally by nodes in the messaging context at step 706. If the message received at step 702 does have an attachment or has other content (such as a URL) that needs to be analyzed, then the message may be duplicated (at step 708). At step 710, the original message may be processed normally by nodes in the messaging context. For example, a result of the processing at step 710 may be delivering the message to the recipient. In various embodiments, as discussed above, other actions may be performed at this step in accordance with other contexts. As an example, if the file was associated with a file uploading context, a result of the processing at step 710 may be allowing the files to be uploaded rather than delivering a message. Steps 708 and 710 are, in various embodiments, performed when the malware detection system operates in a passive mode. As discussed further below, while malware detection proceeds, the messages (when the system is analyzing files from a messaging context) are not prevented from being delivered or otherwise processed by nodes or systems of the messaging context. By duplicating the message at step 708, a copy of the message may be processed by the malware detection system while another copy may be processed as normal by the messaging context as in step 710. Ingest block 130 of FIG. 1 may provide an example for how step 708 may be implemented in various embodiments.

Steps 712-724, in some embodiments, may be performed similarly as steps 610-622 in FIG. 6. Generally, a file attached to the message duplicated at step 708 undergoes malware detection in steps 712-724. A policy selected at step 716 is used to determine various malware detection schemes that are applied at step 720 and the results of the malware detection schemes are analyzed at step 724.

At step 726, in some embodiments, the results of applying an adjudication policy at step 724 are analyzed to determine if the file is suspected malware. If these results indicate that the file is suspected malware, then step 732 may be performed. If these results indicate that the file is not suspected malware, then analysis for that file may be complete. In some embodiments, the file may be part of a group of files that are being analyzed. If this is the case, determining that a file of the group of files is not suspected malware will not end the analysis of the group of files. Rather, this determination is stored and used to analyze the other files in the group, as described further below at step 736. Step 726 may be performed similarly to step 624 in FIG. 6 in various embodiments.

Step 727, in some embodiments, may be performed in a manner similar to step 626 of FIG. 6. In this situation, a file has been determined to have already been analyzed by the malware detection system. Hence, results from the previous analysis are obtained in this step in various embodiments. At step 729, the results are analyzed to determine if the analysis on the file has been completed and a characterization of the file has been determined. If a characterization of the file is not available, then step 727 may be performed. In some cases, the system may continue to perform steps 727 and/or 729 until a determination that the file is either known to be malware or known not to be malware is completed. If a characterization is available, then step 730 may be performed.

At step 730, in some embodiments, the characterization of the file that was previously determined is examined. If the file was previously adjudicated as known malware, then step 736 may be performed. If the file was previously adjudicated as not being malware, then the analysis for that file may be complete. In some embodiments, the file may be part of a group of files that are being analyzed. If this is the case, determining that a file of the group of files is not suspected malware will not end the analysis of the group of files. Rather, this determination is stored and used to analyze the other files in the group, as described further below at step 736.

Steps 732 and 733 may be accomplished in a manner similar to step 632 and step 634 at FIG. 6. In various embodiments, the file may be reviewed by human analysts at step 732 and a response from the human analyst may be awaited at step 733. At step 734, this response may be received and a determination is made as to whether the human analyst has indicated that the file is malware. If the file is determined to be malware, step 736 may be performed. If the file is determined not to be malware, the analysis of the file may be complete. As with steps 726 and 730, in various embodiments, when the file is determined not to be malware, then nothing more needs to be done to the message because the message was not delayed in its processing due to the malware detection schemes since the system is operating in a passive mode. In some embodiments, the file may be part of a group of files that are being analyzed. If this is the case, determining that a file of the group of files is not suspected malware will not end the analysis of the group of files. Rather, this determination is stored and used to analyze the other files in the group, as described further below at step 736.

Step 736 may be accomplished in a manner similar to step 640 of FIG. 6. Generally, actions may be performed based on a determination that the file is known to be malware. These actions may be determined based on one or more disposition policies. For example, such actions may include removing the file, sanitizing the file, quarantining the file, and/or sending the file for review by human analysts. The actions may be done in response to obtaining the results of a previous analysis of the file, a response from human analysts, or the application of an adjudication policy based on results returned by detection nodes applying various malware detection schemes to the file. Information about the file may also be stored with the file in some embodiments. For example, message headers associated with the file may be stored with the file at step 736. As another example, timing information related to when the message was received or when the message was processed with the file. As yet another example, information as to how the file was determined to be malware may also be stored along with the file at step 736.

At step 738, a warning may be sent in response to determining that the file is determined to be malware. In various embodiments, as a result of operating in a passive mode, an indication may be sent that the file was detected as malware since the process of the message was not delayed while the malware detection analysis was being applied to the file. For example, if the file was determined to be malware, then a message may be sent to an administrator to inform the administrator that a message had been processed that included malware. Other examples of warnings or indicators that may be sent include sending a warning to recipients of the message. An example of the latter response may include an agent that is installed at the recipient's computer wherein the agent is configured to take actions to prevent damage to the computer based on the malware that may have been delivered to the computer while the message was being analyzed for malware.

FIG. 8 is a flowchart that illustrates one embodiment of a malware detection system dynamically changing between an active and a passive mode. In some embodiments, the steps of FIG. 8 may be performed with items such as monitor module 270 of FIG. 2. At step 810, detection nodes employed to apply malware detection schemes to a file are monitored. In some embodiments the monitoring may occur by communicating with agents that are associated with the detection nodes, such as agent 340. Information analyzed while monitoring the detection nodes may include the number of idle nodes, the number of nodes that are actively processing jobs, the amount of time that each job will take, the number of jobs to be processed, the number of jobs that are assigned to each detection node, the amount of delay introduced to the context associated with the file (i.e., delay before an e-mail is delivered or delay before a file is allowed to be uploaded). Other types of information may also be collected. For example, information based on the type of malware detection schemes that a detection node applies may also be monitored. Such information may include information related to behavior-based malware detection schemes, signature-based malware detection schemes, classification-based malware detection schemes, and/or metadata-based malware detection schemes.

At step 820, in some embodiments, a determination may be made as to whether or not a threshold has been surpassed based on the information determined at step 810. A variety of thresholds may be used alone or in combination during this step. For example, if the amount of load (current and/or predicted) to be placed on detection modes indicates that the response times to the jobs that are scheduled to be applied to detection nodes are over a particular amount, then a threshold may be surpassed. In another example, jobs may be processed by different types of detection nodes. As such, the overall load on all the detection nodes may be below a threshold for the collection of detection nodes. A particular set of detection nodes that are used to perform a particular malware detection scheme, however, may have a sufficiently high load that another threshold may be surpassed. An example of this situation is when there is a large number of behavior-based malware detection schemes to be processed but only a certain set of the detection nodes may be able to process those types of jobs. As a result, the analysis of the file may take a longer time to complete because one of the jobs associated with analyzing the file includes analysis by detection nodes that perform behavior-based analysis. A threshold may be surpassed in this type of situation where there is a bottleneck at one or more of the nodes that causes processing of a message to take longer than it should.

In some embodiments, analyzing the load on the detection nodes as well as the list of jobs may cause the system to dynamically reprovision some or all of the detection nodes to alleviate any bottlenecks. For example, in a situation where a surge of files entered the system, detection nodes may be modified so that the increase of jobs may be handled. A detection node that had been applying behavior-based analysis using a particular version of software may be reconfigured to perform generic behavior-based analysis or to perform signature-based or classification-based malware detection. After the surge of jobs has been handled, the system may be configured to configure the detection nodes back to their original state. In this manner, surpassing certain thresholds may be avoided and the system may be able to remain in an active mode.

Thresholds, in some embodiments, may be determined by the context that the file was a part of. For example, a required response time may be lower if the file was part of a messaging environment as opposed to a file uploading context. Hence, a number of suitable considerations may be utilized to create this sophisticated set of thresholds to compare the monitoring information to.

If one or more of the thresholds are surpassed, then step 830 may be performed and the malware detection system may enter (or remain in) a passive mode. If the thresholds are not surpassed, then step 840 may be performed and the malware detection system may enter (or remain in) an active mode. An active mode of operation, in various embodiments, may include pausing the processing of a file while the file is being analyzed for malware whereas a passive mode of operation, in various embodiments, may include allowing a file or a message associated with a file to be processed while the analysis for malware is pending. While in a passive mode, in some embodiments, certain malware detection schemes may be applied as if the system was in the active mode. For example, when processing an e-mail message, signature-based and classification-based malware detection schemes may be applied before the message is allowed to be delivered while behavior-based detection schemes may be applied after the message is allowed to be delivered In some embodiments, when transitioning to a passive mode from an active mode, certain jobs may be placed into a backlog queue where they will be processed as appropriate. For example, behavior-based jobs may be placed in such a queue while signature-based or classification-based jobs may be prioritized. In certain systems, signature-based jobs and classification-based jobs typically run faster than behavior-based jobs. If a signature-based or classification-based job results in a determination that a particular file or a particular message associated with the particular file is malware, in certain embodiments, the behavior-based job for the particular file may be moved up in priority. If the particular file or message is a part of a group of files, it may also be appropriate for all jobs associated with all files and/or messages in the group to be moved up in priority. For example, in response to determining based on a signature-based job that a first file is malware, the classification-based job and behavior-based job of the first file, as well as the jobs for any other files grouped with the first file may be moved up in priority.

After either step 830 or 840, the detection nodes may continue to be monitored (as in step 810). In some embodiments, this may provide the ability for the malware detection system to dynamically change between a passive mode and an active mode depending upon the loads present on the detection nodes. By switching between these modes, the system may be able to balance the competing interests of having greater security by operating in an active mode while also maintaining an acceptable level of quality of service by entering into the passive mode.

FIG. 9 is a flowchart illustrating one embodiment of dynamic scheduling in a malware detection system. In some embodiments, the steps of FIG. 8 may be performed with items such as schedule module 260 of FIG. 2 and/or detection agent 316 of FIG. 3.

A malware detection system, in some embodiments, may schedule the analysis of a file, such as at step 910. This may include assigning one or more detection nodes to apply one or more malware detection schemes to the file (i.e., jobs). In various embodiments, the jobs assigned to the detection nodes relating to applying malware detection schemes to the file may be scheduled based on a first-in-first-out (FIFO) approach. For example, the jobs that are first received to be scheduled may be the jobs that are scheduled to be applied to available detection nodes first. Other suitable scheduling techniques may be used.

In some embodiments, scheduling the analysis of the file includes assigning jobs to detection nodes that are capable of applying particular malware detection schemes. For example, the analysis of a file may include several detection jobs such as applying a signature-based detection scheme and applying a behavior-based detection scheme. In such situations, it may be the case that certain detection nodes are capable of applying signature-based detection schemes while other detection nodes are capable of applying behavior-based malware detection schemes. As a result, in various embodiments, the scheduling of the analysis of a file may include maintaining separate queues for scheduling jobs for each detection node.

At step 920, in some embodiments, a result from the completion of a job at a detection node may be determined. This may be received by an agent present on the detection node. The agent may determine the results of the detection node and send those results. At step 930, the jobs currently scheduled for the detection nodes may be reassessed based on the result determined at step 920. For example, if the result of the completion of a job at a detection node indicates that a file may be malware, a malware detection system may consider other jobs associated with that file to be important. In some embodiments, other jobs associated with the file may be assessed to determine when they are scheduled to be processed by a detection node.

At step 940, in some embodiments, a job associated with the file may be prioritized for processing at a detection node. This may be done in response to the assessment at 930. For example, a file may have had three jobs associated with it in order to determine if a file is malware. The first job may have been assigned to a detection node identifying metadata-based detection schemes. The second job may have been assigned to a detection node applying signature-based detection schemes. The third job may have been assigned to a detection node performing behavior-based detection schemes. The first job may have been completed and the result may have been determined at step 920. In response to step 930, it may have been determined that the remaining two jobs should be prioritized higher than they currently were. The queue maintained for the detection nodes that were scheduled to process the second and third jobs may then be altered such that, for example, the detection nodes may process the second and third jobs once they have completed their current analysis without regard to the pending jobs in the queue.

In some embodiments, prioritizing the jobs associated with the file at the detection nodes may include determining if other jobs scheduled to be processed by the detection nodes have been previously prioritized. If this is the case, then the jobs currently being prioritized for the file may be processed after jobs that have previously been prioritized but before other jobs that have not been prioritized. In some embodiments, prioritizing the file may include assigning priority ranks to jobs associated with the file. In this manner it may be possible to prioritize a job associated with a file over a job that has been previously prioritized. As a result of the prioritization, jobs associated with the file may be processed sooner then they would have otherwise. This may, in some embodiments, allow a malware detection system to dynamically allocate resources based on results generated by detection nodes before the file has been completely analyzed.

FIG. 10 is a flowchart illustrating one embodiment of applying a behavior-based malware detection scheme to a file. In various embodiments, some or all portions of detection subsystem 300 may be used to implement some or all of the steps of FIG. 3.

At step 1010, a baseline image of a guest operating system may be stored at a hypervisor. A hypervisor may store the baseline image before providing the file to the guest operating system. In some embodiments, this may allow the hypervisor to maintain a pristine state of the guest operating system before performing malware detection schemes within the guest operating system. Multiple baseline images, in some situations, may be stored at this step as well. In various embodiments, this may allow one machine with a single hypervisor to run multiple guest operating systems at the same time.

At step 1020, in some embodiments, the hypervisor may receive a file to be analyzed. In certain cases, the hypervisor may receive this file from an agent coupled to the hypervisor. At step 1030, the file may be accessed within the guest operating system. The type of access performed by the guest operating system may be determined based on the type of file in various embodiments. For example, if the file is an executable file then the file may be executed at step 1030. If the file has an associated application such as a MICROSOFT WORD document or a Portable Document Format (PDF) document, then the associated application may open the file at this step. As another example, if the hypervisor receives a URL, an Internet browser (such as INTERNET EXPLORER or MOZILLA FIREFOX) may be used to access the file at this step. In some situations, the hypervisor may access the file within multiple guest operating systems that are on the same machine.

At step 1040, in some embodiments, the access to the file may be monitored. This may be facilitated by the hypervisor. In various embodiments, the hypervisor may provide monitoring of the behavior of the file while it is being accessed without running a process in the guest operating system. In some cases, the hypervisor may monitor the accessing of the file in multiple guest operating systems on the same machine. At step 1045, in some embodiments, changes to the guest operating system occurring as a result of accessing the file at step 1030 may be tracked. For example, this may occur by maintaining the changes made to the guest operating system in memory. In various embodiments, the changes may be stored on disk instead of in memory. A suitable disk may, for example, include one or more hard drives, removable media, and/or storage arrays. In certain situations, it may be advantageous to store the changes in memory because the reversion discussed below at step 1060 may be accomplished quicker. The items stored in memory may be an optimized form of representing the changes. Other items that are tracked may include processes, crashes, network activity, and/or other suitable activities. In some embodiments, the hypervisor may allow for tracking changes in memory or on disk that occur on multiple guest operating systems on the same machine.

At step 1050, one or more results may be determined based upon the monitoring of the access of the file performed at step 1040. The results may include determining that the file behaved normally, determining what aspects of the guest operating system were affected by accessing the file, determining how the resources of the virtualized hardware were used during access of the file, and/or other items associated with accessing the file. In various embodiments, it may be determined whether the file is suspected malware or not suspected malware. At step 1060, the guest operating system may be reverted to the baseline image stored at step 1010. This may be done using the changes stored in memory at step 1045. In some embodiments, multiple guest operating systems may be reverted to the same or a different baseline image. The changes occurring on each guest operating system that may be stored in memory (or on disk, in some cases) at step 1045 may be used to revert each of the guest operating systems.

At step 1070, in some embodiments, a report may be sent based on the monitored behavior and results at steps 1040 and 1050. An agent associated with the hypervisor may gather the information and send the report. The report may include information such as the name of the file, the type of the file, the versions of applications used to access the file, the versions of the guest operating system used to access the file, the version of the hypervisor used to access the file, the changes to the guest operating system while the file was being accessed, the resources of the virtualized hardware being used while the file was being accessed, and/or other items associated with accessing the file. This information may be used by human analysts to determine whether or not the file is malware or to gain more insight to the file.

Figure 11:
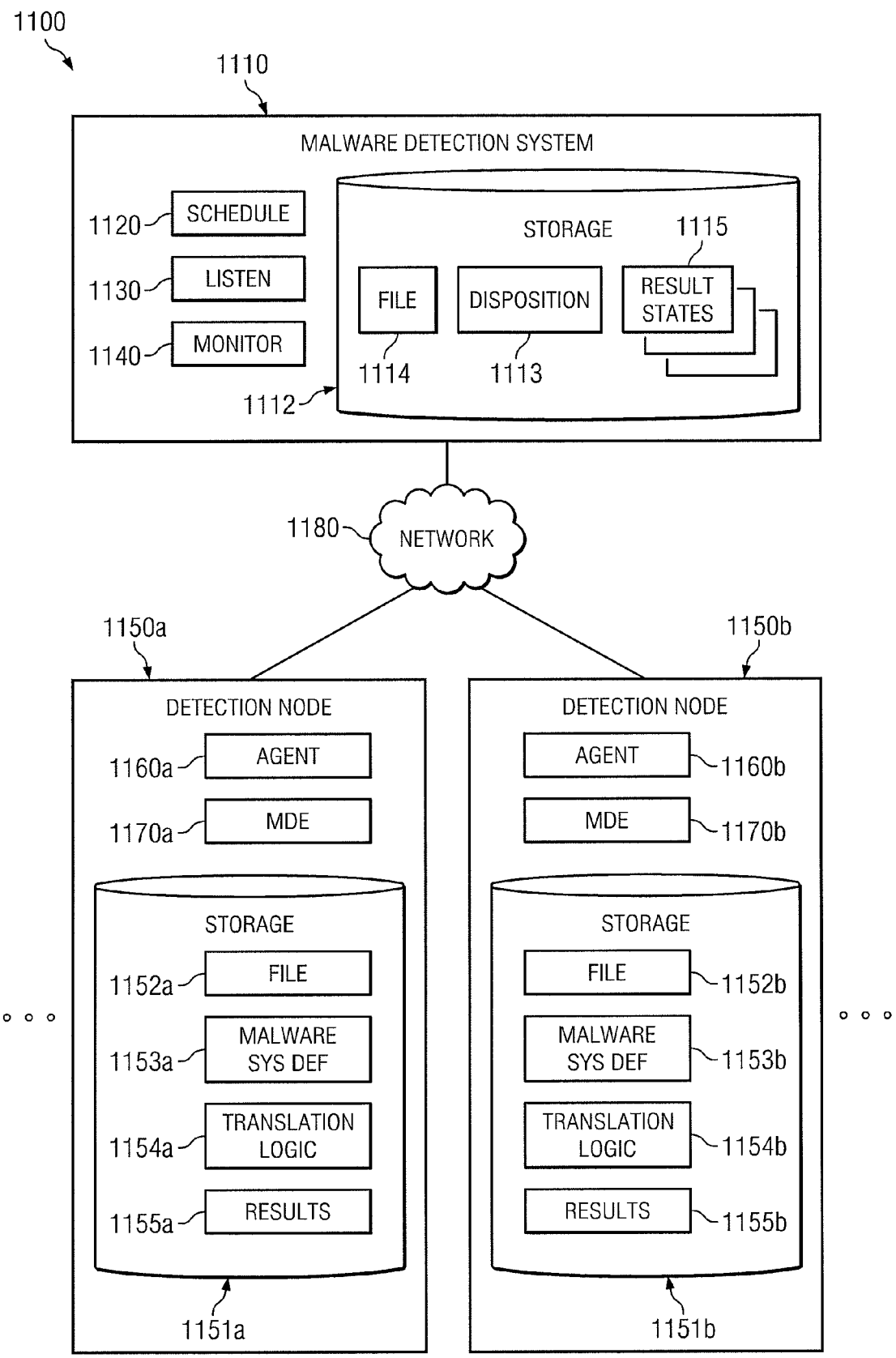
FIG. 11 is a block diagram illustrating one embodiment of a system that is operable to detect malware using multiple detection nodes.

FIG. 11 is a block diagram illustrating one embodiment of a system 1100 for detecting malware using multiple detection nodes 1150*a-b*. The block diagram includes malware detection system 1110, network 1180, and detection nodes 1150*a-b*. Network 1180 communicatively couples malware detection system 1110 and detection nodes 1150*a-b*. Malware detection system 1110 may send a file to be analyzed by detection nodes 1150*a-b* using network 1180. Detection nodes 1150*a-b* may communicate to malware detection system 1110 the results of applying malware detection techniques using network 1180. Malware detection system 1110, storage 1112, schedule module 1120, listen module 1130, monitor module 1140, detection nodes 1150*a-b*, storage 1151*a-b*, agents 1160*a-b*, malware detection engines 1170*a-b*, and network 1180 may be implemented using any suitable combination of one or more items of hardware, firmware, and software.

In some embodiments, system 1100 provides an environment where various malware detection techniques may be incorporated into the analysis of file 1114 using multiple detection nodes 1150. For example, malware detection system 1110 requests that detection nodes 1150*a-b* apply different malware detection techniques to file 1114. The requests are in a format that malware detection system 1110 and detection nodes 1150*a-b* are configured to understand. Detection nodes 1150*a-b* provide file 1114 to malware detection engines 1170*a-b*, respectively, in a different format than the request received from malware detection system 1110. After the different malware detection techniques are applied to file 1114, detection nodes 1150*a-b* provide result states 1115 to malware detection system 1110 in a common format based on results generated by malware detection engines 1170*a-b*. In some embodiments, system 1100 allows for the efficient addition of new malware detection techniques by providing a common format for sending requests for, and receiving results from, the application of various malware detection techniques at different detection nodes 1150.

Malware detection system 1110 may, in some embodiments, include storage 1112. Storage 1112 may store disposition 1113, file 1114, and result states 1115. Storage 1112 may be coupled to one or more of modules 1120, 1130, and 1140. In some embodiments, storage 1112 may reside on separate hardware than malware detection system 1110 and be coupled to malware detection system 1110. For example, storage 1112 may be coupled to malware detection system 1110 through a wired interface such as USB or FIREWIRE or through one or more networks.

In various embodiments, storage 1112, storage 1151*a* (described below), and storage 1151*b* (described below) may be implemented using any suitable combination of one or more items of hardware, firmware, and software. Storage 1112, 1151*a*, and 1151*b* may include a software storage application (such as a database) and/or computer-readable storage media such as, but not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, flash disks, solid state storage devices, and other suitable computer-readable storage media. Storage 1112, 1151*a*, and 1151*b* may also be implemented using network attached storage (NAS) or a storage area network (SAN).

Malware detection system 1110 may, in some embodiments, include schedule module 1120, listen module 1130, and monitor module 1140. Schedule module 1120, listen module 1130, and monitor module 1140, in some embodiments, may each be implemented using any suitable combination of one or more items of hardware, firmware, and software. In some embodiments, schedule module 1120, listen module 1130, and monitor module 1140 may each be combined with one another. Schedule module 1120, listen module 1130, and monitor module 1140 may each reside on the same hardware as malware detection system 1110 or they may each reside on separate hardware.

Schedule module 1120, in some embodiments, may be implemented similarly to schedule module 260 of FIG. 2. Schedule module 1120 may send requests to detection nodes 1150*a-b* to apply malware detection techniques to one or more files (such as file 1114). Schedule module 1120 may also send to detection nodes 1150*a-b* the files and/or information (e.g., links or other file path information) indicating from where the files may be retrieved.

In some embodiments, listen module 1130 may be configured to receive communication from detection nodes 1150*a-b*. For example, listen module 1130 may receive various forms of communication from detection nodes 1150*a-b*, including one or more of a status, a connection request, and one or more result states (such as result states 1115). In some embodiments, listen module 1130 may also be configured to send received communication to other aspects of malware detection system 1110, such as schedule module 1120, monitor module 1140, and storage 1112.

In some embodiments, monitor module 1120 may be implemented similarly to monitor module 270 of FIG. 2. Monitor module 1120 may request and/or retrieve monitoring information regarding detection nodes 1150*a-b*. For example, monitor module 1120 may send a communication to detection nodes 1150*a-b* requesting status information. The status information may include the availability of a detection node 1150 and/or the status of applying a malware detection technique.

In some embodiments, detection nodes 1150*a-b* may include agents 1160*a-b*, malware detection engines 1170*a-b*, and storage 1151*a-b*, respectively. Each of blocks 1151*a*, 1160*a*, and 1170*a* may reside on the same or different hardware as detection node 1150*a* and each of blocks 1151*b*, 1160*b*, and 1170*b* may reside on the same or different hardware as detection node 1150*b*. In some embodiments, system 1100 may include other detection nodes 1150 that may be configured similarly and contain similar components as detection nodes 1150*a-b*. Although a particular number of detection nodes 1150 are shown and described, the present disclosure contemplates system 1100 including any suitable number of detection nodes 1150. All detection nodes 1150 may be coupled to malware detection system 1110 via network 1180. In various embodiments, blocks 1160*a* and 1170*a* may reside on the same hardware or be implemented as components in one software and/or firmware set. This may also be true of blocks 1160*b* and 1170*b*.

In some embodiments, agents 1160*a-b* may be implemented using any suitable combination of one or more items of hardware, firmware, and software. For example, agents 1160*a-b* may be implemented as Java programs or objects. Agents 1160*a-b* may be implemented in computer languages that operate at the network level as well. Agents 1160*a-b* may be configured to interface with malware detection system 1110 through network 1180. In some embodiments, agents 1160*a-b* may be configured to communicate with malware detection system 1110 in one format and to communicate with malware detection engines 1170*a-b* (respectively) in another format. The following is a description of example configurations and operations of agent 1160*a* in communicating with malware detection system 1110 and malware detection engine 1170*a*. Agent 1160*b* may be similarly configured to perform the operations discussed below with components in detection node 1150*b* such as malware detection engine 1170*b*.

In some embodiments, agent 1160*a* may use malware system definition 1153*a* and translation logic 1154*a* in communicating with malware detection system 1110. In some embodiments, agent 1160*a*, malware system definition 1153*a* and translation logic 1154*a* may be implemented using any suitable combination of one or more items of hardware, firmware, and software. Malware system definition 1153*a* may include information regarding the format and content of messages used by malware detection system 1110. Malware system definition 1153*a* may also include information regarding the protocol(s) used to communicate with malware detection system 1110. In some embodiments, translation logic 1154*a* may include logic, code, table(s), and or database(s) used to determine messages to be communicated from agent 1160*a* to malware detection system 1110 and/or malware detection engine 1170*a*.

For example, agent 1160*a* may receive communication from malware detection system 1110 and use malware system definition 1153*a* to analyze the communication. Agent 1160*a* may then use translation logic 1154*a* to determine one or more messages to send to malware detection engine 1170*a* in response to the message received from malware detection system 1110 because malware detection engine 1170*a* may not be capable of processing messages from malware detection system 1110. Agent 1160*a* may also receive communication from malware detection engine 1170*a* and use translation logic 1154*a* and/or malware system definition 1153*a* to determine one or more messages to send to malware detection system 1110. In some embodiments, malware detection system 1110 may provide file 1114 to agent 1160*a* for detection node 1150*a* to apply one or more malware detection techniques. This may be stored at detection node 1150*a* as file 1152*a*. Agent 1160*a* may use translation logic 1154*a* and/or malware system definition 1153*a* to communicate with malware detection engine 1170*a* and request that malware detection engine 1170*a* perform the one or more malware detection techniques on file 1152*a*. Agent 1160*a* may receive results 1155*a* from malware detection engine 1170*a* after malware detection engine 1170*a* has applied the one or more malware detection techniques to file 1152*a*. Agent 1160*a* may use translation logic 1154*a* and/or malware system definition 1153*a* to communicate one or more result states 1115 to malware detection system 1110 based on results 1155*a* generated by malware detection engine 1170*a*.

In some embodiments, malware detection engines 1170*a-b* may each be configured to apply one or more malware detection techniques. Example malware detection techniques include classification schemes (such as recognizing generic suspect patterns), signature-based detection schemes (such as those looking for specific byte patterns), meta-data detection schemes, as well as behavior-based detection schemes. Malware detection engines 1170*a-b*, in some embodiments, may be stand-alone security devices and/or security software that may be incorporated into system 1100 by means of agents 1160*a-b*, respectively. Malware detection engines 1170*a-b*, in some embodiments, may receive and send messages in a manner that is particular to that malware detection engine 1170. For example, malware detection engine 1170*a* may not be configured to communicate directly with malware detection engine 1170*b* or malware detection system 1110. Agent 1160*a* may be configured to communicate with malware detection engine 1170*a* and also configured to communicate with malware detection system 1110, thereby allowing malware detection engine 1170*a* and malware detection system 1110 to communicate. In some embodiments, this may be advantageous because system 1100 may be able to use a variety of existing malware detection schemes and/or engines without having to reconfigure the malware detection engine.

Malware detection system 1110 and detection nodes 1150*a-b* may communicate with each other using network 1180. Network 1180, in some embodiments, may be a communicative platform operable to exchange data or information. In various embodiments, the network may include a packet data network offering communication interfaces or exchanges between any two nodes in system 1100. Network 1180 may be, or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, networks 110 and 120 may each include firewalls or other equipment or software that create security zones and/or secure networks such as DMZs. One or more of blocks 1110-1170 may be located in one more of such security zones and/or secure networks in some embodiments. For example, detection nodes 1150*a-b* may be in a DMZ or sandbox that is separate from malware detection system 1110. As another example, each of malware detection system 1110 and detection nodes 1150*a-b* may reside in separate portions of network 1180, each portion separated by a firewall or other security device and/or software.

In operation, in some embodiments, detection nodes 150*a-b* may receive a file communicated by malware detection system 1110 using network 1180. Malware detection system 1110 may use the same communication format when communicating with detection nodes 150*a-b*. Detection node 150*a* may apply a malware detection technique to the file while detection node 150*b* may apply a different malware detection technique to the file. Detection nodes 150*a* and 150*b* may each provide the file to malware detection engines 1170*a* and 1170*b*, respectively. Detection node 1150*a* may provide the file to malware detection engine 1170*a* in a format specific to malware detection engine 1170*a* and different than the format used to communicate with malware detection system 1110. Similarly, detection node 1150*b* may provide the file to malware detection engine 1170*b* in a format specific to malware detection engine 1170*b* and different than the format used to communicate with malware detection system 1110 and the format used by detection node 1150*a* when communicating with malware detection engine 1170*a*. After applying the different malware detection techniques, each of malware detection engine 1170*a* and 1170*b* may provide one or more results 1155*a-b* to detection nodes 150*a* and 150*b*, respectively. Malware detection engine 1170*a* may provide one or more results 1155*a* to detection node 150*a* in a format different than the one or more results 1155*b* provided by malware detection engine 1170*b* to detection node 150*b*. Detection nodes 150*a-b* may determine one or more predefined result states 1115 based on the one or more results 1155*a-b* received from malware detection engines 1170*a-b*, respectively. Detection nodes 150*a-b* may communicate the predefined result states 1115 to malware detection system 1110. Malware detection system 1110 may analyze the predefined result states 1115 to determine whether the file is malware.

In some embodiments, the components of system 1100 may operate as described above to provide one or more advantages. One advantage may be that system 1100 may be configured to implement a new malware detection techniques in an efficient manner. For example, a new agent 1160 and translation logic 1154 may be developed to interact with an existing malware detection engine 1170 that implements the new malware detection technique. As another example, a developer of a malware detection technique may integrate a malware detection engine 1170 implementing the technique into system 1100 by configuring a corresponding agent 1160 and translation logic 1154. Another advantage may be that malware detection system 1110 may be able to efficiently assimilate and analyze results 1155*a-b* of a variety of malware detection techniques applied to file 1114 using result states 1115 received from detection nodes 1150*a-b*. Another advantage may be that system 1100 may apply multiple malware detection techniques to file 1114 in parallel by using multiple detection nodes 1150 simultaneously.

Figure 12:
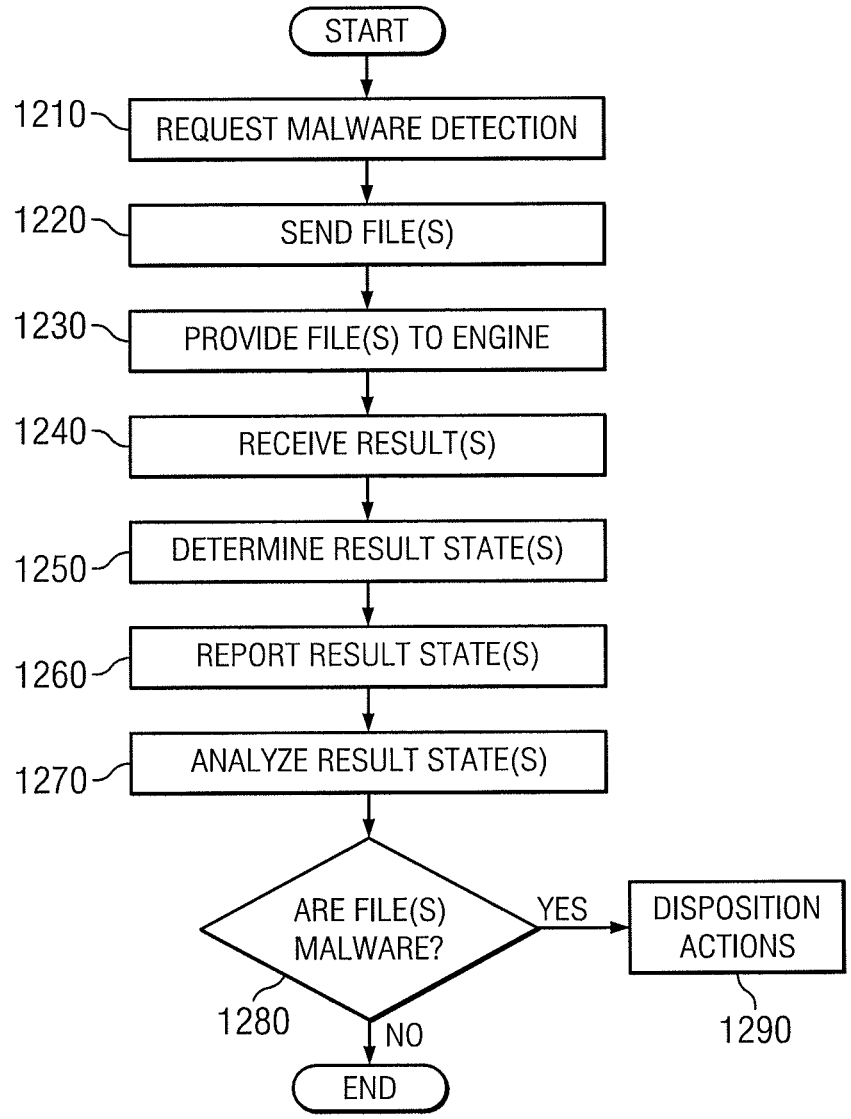
FIG. 12 is a flowchart illustrating one embodiment of how a file may be analyzed using multiple detection nodes applying multiple malware detection techniques.

FIG. 12 is a flowchart that illustrates one embodiment of the operation of a malware detection system. In general, the steps illustrated in FIG. 12 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-5 and 11.

FIG. 12 is a flowchart illustrating one embodiment of how a file may be analyzed using multiple detection nodes applying multiple malware detection techniques. The flowchart illustrates how the results of separate detection nodes may be communicated in a common format to a malware detection system.

At step 1210, in some embodiments, a request for malware detection may be sent from a malware detection system to a detection node. The request may be formatted in a format that the detection nodes and the malware detection system are able to process. The request may specify that the detection node should apply a particular malware detection technique to one or more files. The request, in some embodiments, may also contain parameters that are to be used when applying the malware detection technique to the one or more files. For example, the parameters could specify what application should be used to open or access the one or more files by the malware detection engine.

At step 1220, in some embodiments, one or more files may be sent from the malware detection system to the detection node that received the request at step 1210. The one or more files may be sent to the detection node by attaching the one or more files to a message. In some embodiments, one or more references to the one or more files may be sent to the detection node at this step instead of sending the files themselves. The one or more references may be references to a portion of a network where the one or more files may be retrieved. In some embodiments, the operations performed at step 1220 may be performed at step 1210. For example, the request sent at step 1210 may already include the one or more files or may include references from where the one or more files may be retrieved. In such cases, step 1220 may not be performed separately from step 1210.

At step 1230, in some embodiments, the one or more files may be provided to a malware detection engine residing on the detection node that received the request sent at step 1210. The engine at the detection node may be unable to process communication received from the malware detection system due to the format of the communication sent by the malware detection system. In some embodiments, an agent on the detection node may receive the request sent at step 1210 and determine that a request for the application of a malware detection technique was sent by the malware detection system. The agent may be configured to provide the one or more files to the engine in a format that the engine is able to process. The agent may retrieve the one or more files that are to be processed by the engine from the message sent at step 1210 or using information found in the message sent at step 1210. For example, the agent may determine a location of the one or more files from the message sent at step 1210 and retrieve the one or more files from the location. The agent may send instructions to the engine in a format that the engine can process including the one or more files and or parameters that may have been specified in the request sent at step 1210. These instructions may be in a format different than the request sent at step 1210 by the malware detection system.

For example, the engine at the detection node may be invoked using a command-line interface. The detection node may create and issue a command invoking the engine by analyzing and mapping the contents of the request received at step 1210. As another example, the engine at the detection node may utilize a graphical interface. The detection node may automatically launch and manipulate the engine using simulated mouse clicks or keystrokes based on the contents of the request received at step 1210. As another example, the engine may be configured to automatically apply a malware detection technique to files present in one or more directories. The detection node may be configured to receive or retrieve one or more files from the malware detection engine (as discussed in steps 1210 and 1220) and place the file(s) in the one or more directories used by the engine.

At step 1240, in some embodiments, the engine may provide one or more results from applying the malware detection technique to the one or more files. The result(s) may be in a format that the malware detection system may not be configured to process. The agent on the detection node may receive the results from the detection engine. At step 1250, in some embodiments, the agent may determine one or more result states from the results received from the detection engine. The results states may be in a format that the malware detection system uses to determine whether the one or more files are malware. The result states may be used by various detection nodes that have different malware detection engines when communicating the results of applying the malware detection techniques to the malware detection system.

For example, the malware detection system may be configured to receive five possible result states regarding the file(s): "unsafe," "potentially unsafe," "safe," "error," or "failure." The agent may be configured to determine one of these result states based on the results received from the engine. The engine may determine that the file matches a signature of known malware. In such cases, the detection node may determine that this corresponds to the "unsafe" result state. The engine may determine that the file is structured abnormally or causes abnormal behavior when executed or accessed by an application. In such cases, the detection node may determine that this corresponds to the "unsafe" or "potentially unsafe" result state. If the engine fails to process the file, then a "failure" result state may be determined. If an error occurs while the engine is processing the file, then an "error" result state may be determined. The engine may determine a probability that the file is malware. The detection node may use thresholds when analyzing the reported probability in order to determine the corresponding result state (i.e., if the probability is between 0 and 10 percent, then the "safe" result state may be determined; if the probability is between 11 and 49 percent, then the "potentially unsafe" result state may be determined; and if the probability is 50 percent or greater, then the "unsafe" result state may be determined). The preceding examples illustrate various embodiments of how the detection node may determine result states based on the results provided by the engine. Other suitable techniques may be used to determine result states.

At step 1260, in some embodiments, the detection node may report the result states to the malware detection system. This communication may be in a format that is commonly used by other detection nodes communicating with the malware detection system. The reported result states may include the result states determined at step 1250. The detection node may also include other information in the communication including the result states. For example, log files, network dumps, forensic data capture information, or other data that is generated as a result of applying the malware detection technique to the one or more files may be communicated at step 1260. In some embodiments, this may provide an advantage in that the data sent at this step along with the result states may be provided automatically to a human reviewer to facilitate the human reviewer's analysis. As another example, one or more files that may have been generated while the malware detection technique was applied may also be transmitted at step 1260. In some embodiments, items such as log files or files created as a result of applying the malware detection technique may be stored and references to where these files may be retrieved may be sent to the malware detection system at step 1260.

Figure 13:
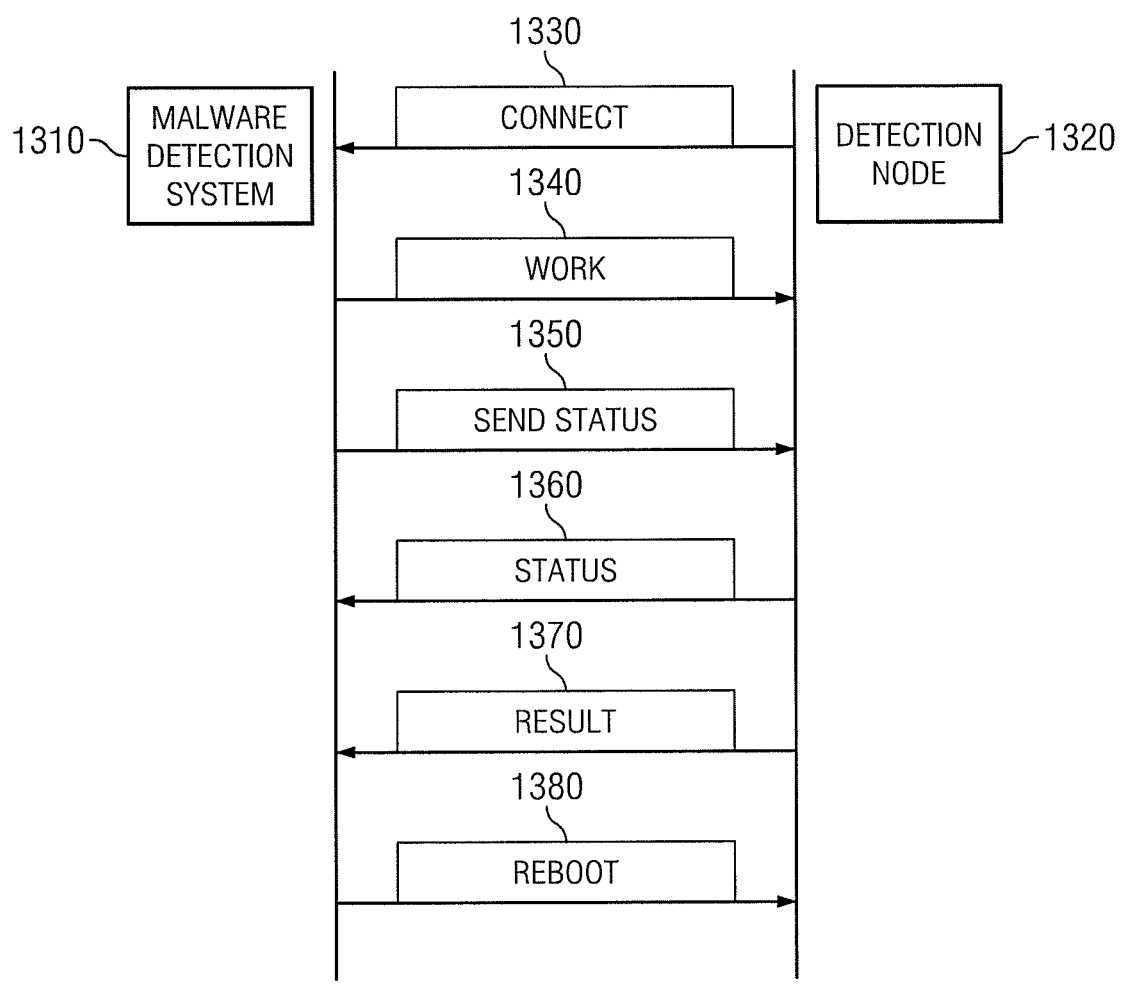
FIG. 13 illustrates one embodiment of messages that may be sent between a malware detection system and a detection node.

FIG. 13 illustrates one embodiment of messages that may be sent between malware detection system 1310 and detection node 1320. In some embodiments, malware detection system 1310 and detection node 1320 may be implemented similar to malware detection system 1110 and detection node 1150a or 1150b of FIG. 11, respectively. One or more of the messages discussed below may be used to implement the communication discussed in FIGS. 11-12. Detection node 1320 may be one of several detection nodes (each detection node implementing different malware detection techniques) with which malware detection system 1310 communicates. In some embodiments, the messages discussed below may be transmitted in a secure manner. For example, the communication of the messages discussed below may use cryptographic protocols such as Transport Layer Security (TLS) or Secure Sockets Layer (SSL).

In some embodiments, malware detection system 1310 may communicate with the several detection nodes using the same messages depicted in FIG. 13 when communicating with detection node 1320. While FIG. 13 and its description below describe embodiments of messages sent between malware detection system 1310 and detection node 1320, suitable variations may be introduced without departing from the scope of the present disclosure. For example, the set of messages discussed below may be sent in a different order, altered, combined, divided, enlarged, or reduced to facilitate efficient and functional communication between malware detection system 1310 and detection node 1320.

In some embodiments, detection node 1320 may send CONNECT message 1330 to malware detection system 1310. CONNECT message 1330 may indicate to malware detection system 1310 the presence of detection node 1320 and provide information to malware detection system 1310 that facilitates subsequent communication between malware detection system 1310 and detection node 1320. The following is an example of how CONNECT message 1330 may be implemented:

Message Format: CONNECT|<IP address>|<port>|<node type>|<# of threads>
    <IP address>: The IP address of detection node 1320.
    <port>: The port that detection node 1320 uses for incoming connections
    <node type>: The type of malware detection technique applied by detection node 1320. Can be 0 (classification detection scheme), 1 (signature-based detection scheme), 2 (meta-data detection scheme), 3 (behavior-based detection scheme).
    <# of threads>: The number of simultaneous files that detection node 1320 can process.

In some embodiments, malware detection system 1310 may send WORK message 1340 to detection node 1320. WORK message 1340 may instruct detection node 1320 to apply a malware detection technique to one or more files. The following is an example of how WORK message 1340 may be implemented:

Message Format: WORK|<file shared>|<file name>|<MIME type>|<file ID>|<return files>|<file size>|<optional payload>
    <file shared>: Set to "1" if the file resides at a network location accessible by detection node 1320; set to "0" if the file will be sent as part of the message.
    <file name>: If the file resides at a network location accessible by detection node 1320, this is set to a path that indicates the network location; if the file is attached to the message, then this is set to the name of the file.
    <MIME type>: The Multipurpose Internet Mail Extensions (MIME) type of the file.
    <file ID>: The identifier (ID) of the file assigned by malware detection system 1310.
    <return files>: Set to "1" if files, such as registry dumps or malware payloads, should be sent from the client after the analysis result if the file was determined to be malware; set to "0" if only the result of applying a malware detection technique should be returned, and not any files.

<file size>: Set to "0" if the file resides at a network location accessible by detection node 1320; set to the size of the file if the file is attached to the message.

<optional payload>: The binary data of the file if the file is attached to the message.

In some embodiments, malware detection system 1310 may send SEND STATUS message 1350 to detection node 1320. SEND STATUS message 1350 may instruct detection node 1320 to send its status to malware detection system 1310. The following is an example of how SEND STATUS message 1350 may be implemented:

Message Format: SEND STATUS

In some embodiments, detection node 1320 may send STATUS message 1360 to malware detection system 1310. STATUS message 1360 may inform malware detection system 1310 as to the current status of detection node 1320. The following is an example of how STATUS message 1360 may be implemented:

Message Format: STATUS|<IP address>|<status>

<IP address>: The IP address of detection node 1320.

<status>: Indicates the status of detection node 1320. Set to: "1" (initializing), "2" (idle), "3" (busy), and "4" (archiving).

In some embodiments, detection node 1320 may send RESULT message 1370 to malware detection system 1310. RESULT message 1370 may inform malware detection system 1310 the results of applying a malware detection technique to a file.

The following is an example of how RESULT message 1370 may be implemented:

Message Format: RESULT|<IP address>|<file ID>|<result>

<IP address>: The IP address of detection node 1320.

<file ID>: The identifier (ID) of the file assigned by malware detection system 1310.

<result>: The result of applying a malware detection technique to the file. Set to "0" if the file is determined to be safe as a result of applying the malware detection technique and set to "1" if the file is determined to be not safe as a result of applying the malware detection technique.

In some embodiments, malware detection system 1310 may send REBOOT message 1380 to detection node 1320. REBOOT message 1380 may instruct detection node 1320 to reboot. The following is an example of how REBOOT message 1380 may be implemented:

Message Format: REBOOT

Although the present disclosure has been described with several embodiments, diverse changes, substitutions, variations, alterations, and modifications may be suggested to one skilled in the art, and it is intended that the present disclosure encompass all such changes, substitutions, variations, alterations, and modifications as fall within the spirit and scope of the appended claims.

What is claimed is:

1. A method comprising:
   receiving, at a first malware detection node from a malware detection system, a request to apply a first malware detection technique to a file, the request being in a first format that the malware detection system is configured to use, the request including an instruction having a configuration parameter in the first format to be used in application of the first malware detection technique to the file, the configuration parameter being separate from the file, the malware detection system configured to determine whether the file is suspected malware by analyzing a plurality of predefined result states received in response to the first malware detection node applying the first malware detection technique to the file and a second malware detection node applying a second malware detection technique to the file;
   determining, using an agent and a malware system definition, the agent coupled between the malware detection system and the first malware detection node, that the first format of the request and the configuration parameter are incompatible with a malware detection engine of the first malware detection node;
   formatting, by translation logic and the malware system definition of the first malware detection node and in response to determining that the first format of the request and the configuration parameter are incompatible with a malware detection engine, the request and the configuration parameter of the instruction in a second format different than the first format;
   providing, by the first malware detection node, the file and the configuration parameter to the malware detection engine, the configuration parameter being in the second format, the malware detection engine configured to process files received in requests of the second format but not files received in the first format of the request;
   applying, by the malware detection engine, the first malware detection technique to the file based at least in part on the configuration parameter in the second format, the configuration parameter identifying an application and a version of the application to open the file, a time limit, a format of results, a reason the file is suspect, and a log file;
   receiving, at the first malware detection node, at least one result in the second format from the malware detection engine applying the first malware detection technique to the file;
   determining, at the first malware detection node, at least one predefined result state of the plurality of predefined result states based on the received at least one result; and
   reporting, by the first malware detection node, the at least one predefined result state to the malware detection system.

2. The method of claim 1, wherein:
   the file is a first file; and
   the method further comprises providing, by the first malware detection node, a second file to the malware detection system, the second file generated by the malware detection engine while applying the first malware detection technique to the first file.

3. The method of claim 1, wherein the first malware detection node resides in a first portion of a network and the malware detection system resides on a second portion of the network, the first portion of the network and the second portion of the network separated by a firewall.

4. An apparatus comprising:
   at least one processor;
   at least one computer-readable medium comprising instructions that, when executed by the at least one processor, are operable to:
      receive a request to apply a first malware detection technique to a file from a malware detection system, the request being in a first format that the malware detection system is configured to use, the request including a configuration parameter that is separate from the file to be used in application of the first malware detection technique to the file, the malware detection system configured to determine whether the file is suspected malware by analyzing a plurality of predefined result states received from a plurality of malware detection nodes applying a plurality of malware detection techniques to the file;

determine, using a malware system definition, that the first format of the request and the configuration parameter are incompatible with a malware detection engine of the first malware detection node;

format, using the malware system definition, the request and the configuration parameter, in response to the determination, in a second format different than the first format;

provide the file, the request, and the configuration parameter to the malware detection engine, the request and the configuration parameter being in the second format, the malware detection engine configured to process files received in the request having the second format but not files received in the request having the first format, the configuration parameter identifying an application and a version of the application to open the file, a time limit, a format of results, a reason the file is suspect, and a log file;

apply, by the malware detection engine, the first malware detection technique to the file based at least in part on the configuration parameter in the second format;

receive at least one result in the second format from a malware detection engine of applying the first malware detection technique to the file;

determine at least one predefined result state of the plurality of predefined result states based on the received at least one result; and report the at least one predefined result state to the malware detection system.

5. The apparatus of claim 4, wherein:

the file is a first file; and the instructions, when executed by the at least one processor, are further operable to provide a second file to the malware detection system, the second file generated by the malware detection engine while applying the first malware detection technique to the first file.

6. The apparatus of claim 4, wherein the apparatus resides in a first portion of a network and the malware detection system resides on a second portion of the network, the first portion of the network and the second portion of the network separated by a firewall.

7. A method comprising:

providing by a malware detection system to a first malware detection node, a first request in a first format to apply a first malware detection technique to a file that the malware detection system is configured to use when communicating with the first malware detection node, the first request including the file and a configuration parameter, the first malware detection node configured to translate the request and the configuration parameter to a second format different than the first format and provide the file and the configuration parameter in the second format to a first malware detection engine, the first malware detection engine configured to apply a first malware detection technique to the file based at least in part on the configuration parameter;

providing by the malware detection system to a second malware detection node, a second request in the first format to apply a second malware detection technique to the file that the malware detection system is configured to use when communicating with the first malware detection node, the second request including the file and the configuration parameter, the second malware detection node configured to determine, using a malware system definition, that the first format of the second request and the configuration parameter are incompatible with a malware detection engine of the second malware detection node, and format, using the malware system definition and translation logic, the configuration parameter, in response to the determination, in a second format different than the first format, the configuration parameter identifying an application and a version of the application to open the file, a time limit, a format of results, a reason the file is suspect, and a log file;

receiving, at the malware detection system, a first predefined result state from the first malware detection node in response to the first malware detection engine providing a first result of applying the first malware detection technique to the file, the malware detection system configured to analyze the first predefined result state;

receiving, at the malware detection system, a second predefined result state from the second malware detection node in response to a second malware detection engine providing a second result of applying the second malware detection technique to the file, the malware detection system configured to analyze the second predefined result state;

analyzing, by the malware detection system, the first and second predefined result states; and determining, by the malware detection system, whether the file is malware in response to analyzing the first and second predefined result states.

8. The method of claim 7, further comprising:

sending, by the malware detection system, the file to the second malware detection node in the first format, the second malware detection node configured to translate the configuration parameter to a third format and provide the file to the second malware detection engine in the third format different than the first format and the second format, the second malware detection engine configured to apply the second malware detection technique to the file.

9. The method of claim 7, wherein:

the file is a first file; and the method further comprises receiving, by the malware detection system, a second file from the first malware detection node, the second file generated by the first malware detection engine while applying the first malware detection technique to the first file.

10. The method of claim 7, wherein the malware detection system resides in a first portion of a network and the first malware detection node resides on a second portion of the network, the first portion of the network and the second portion of the network separated by a firewall.

11. An apparatus comprising:

at least one processor; and at least one computer-readable medium comprising instructions that, when executed by the at least one processor, are operable to:

send to a first malware detection node a first request to apply a first malware detection technique to a file, the request being in a first format that the malware detection system is configured to use when communicating with the first malware detection node, the first request including the file and a configuration parameter, the first malware detection node configured to translate, using a malware system definition, the request and the configuration parameter to a second format different than the first format and provide the file to a first malware detection engine with the request in the second format, the first malware detection engine configured to apply a first malware detection technique to the file based at least in part on the configuration parameter, the configuration parameter identifying an application and a version of the application to open the file, a time limit, a format of results, a reason the file is suspect, and a log file;

send to a second malware detection node a second request to apply a second malware detection technique to the file, the second request being in the first format that the malware detection system is configured to use when communicating with the first malware detection node, the second request including the file and a second configuration parameter, the second malware detection node configured to determine, using the malware system definition, that the first format of the file and the second configuration parameter are incompatible with a malware detection engine of the second malware detection node, and format, using the malware system definition, the second request and the configuration parameter, in response to the determination, in the second format different than the first format;

receive a first predefined result state from the first malware detection node in response to the first malware detection engine providing a first result of applying the first malware detection technique to the file in the second format, the apparatus configured to analyze the first predefined result state;

receive a second predefined result state from the second malware detection node in response to a second malware detection engine providing a second result of applying the second malware detection technique to the file, the apparatus configured to analyze the second predefined result state;

analyze the first and second predefined result states; and determine whether the file is malware in response to analyzing the first and second predefined result states.

12. The apparatus of claim 11, wherein the instructions, when executed by the at least one processor, are further operable to:

send the file to the second malware detection node in the first format, the second malware detection node configured to translate the request and the configuration parameter to a third format and provide the file and the configuration parameter to the second malware detection engine in the third format different than the first format and the second format, the second malware detection engine configured to apply the second malware detection technique to the file.

13. The apparatus of claim 11, wherein:

the file is a first file; and the instructions, when executed by the at least one processor, are further operable to receive a second file from the first malware detection node, the second file generated by the first malware detection engine while applying the first malware detection technique to the first file.

14. The apparatus of claim 11, wherein the apparatus resides in a first portion of a network and the first malware detection node resides on a second portion of the network, the first portion of the network and the second portion of the network separated by a firewall.

\* \* \* \* \*